(12) United States Patent
Sabouri et al.

(10) Patent No.: US 12,574,201 B2
(45) Date of Patent: Mar. 10, 2026

(54) DIVIDER PHASE ALIGNMENT AMONG MULTIPLE TRANSMIT AND RECEIVE CHAINS

(71) Applicant: QUALCOMM Incorporated, San Diego, CA (US)

(72) Inventors: Faramarz Sabouri, San Diego, CA (US); Ahmed Abbas Mohamed Helmy, San Diego, CA (US); Mehran Bakhshiani, San Diego, CA (US); Bindu Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 18/340,787

(22) Filed: Jun. 23, 2023

(65) Prior Publication Data

US 2024/0430071 A1     Dec. 26, 2024

(51) Int. Cl.
H04L 7/033          (2006.01)
H04L 27/26          (2006.01)

(52) U.S. Cl.
CPC .......... H04L 7/033 (2013.01); H04L 27/2655 (2013.01)

(58) Field of Classification Search
CPC ............................ H04L 7/033; H04L 27/2655
USPC ...................................................... 455/550.1
See application file for complete search history.

(56) References Cited

U.S. PATENT DOCUMENTS

| | | | |
|---|---|---|---|
| 2003/0030426 A1* | 2/2003 | Pickerd | G01R 27/28 |
| | | | 324/76.58 |
| 2016/0087784 A1* | 3/2016 | Lin | H04L 7/0041 |
| | | | 375/219 |
| 2017/0244415 A1* | 8/2017 | Rajavi | H03L 7/08 |

OTHER PUBLICATIONS

International Search Report and Written Opinion—PCT/US2024/029288—ISA/EPO—Aug. 14, 2024.

* cited by examiner

*Primary Examiner* — Qutbuddin Ghulamali
(74) *Attorney, Agent, or Firm* — Norton Rose Fulbright US LLP

(57)          ABSTRACT

This disclosure provides systems, methods, and devices for wireless communications that support enhanced phase calibration operations. In a first aspect, an apparatus for wireless communications includes a processing system. The processing system is configured to cause the wireless communication device to: receive a reference signal at a respective input of a plurality of receive chains; process, by each receive chain, the reference signal to generate a respective output signal; determine, for each receive chain, a phase alignment difference between the respective output signal of the receive chain and a reference output signal of a reference receive chain of the plurality of receive chains; and adjust a phase alignment of a divider of at least one receive chain of the plurality of receive chains based on the determined phase alignment difference for the at least one receive chain. Other aspects and features are also claimed and described.

30 Claims, 10 Drawing Sheets

700

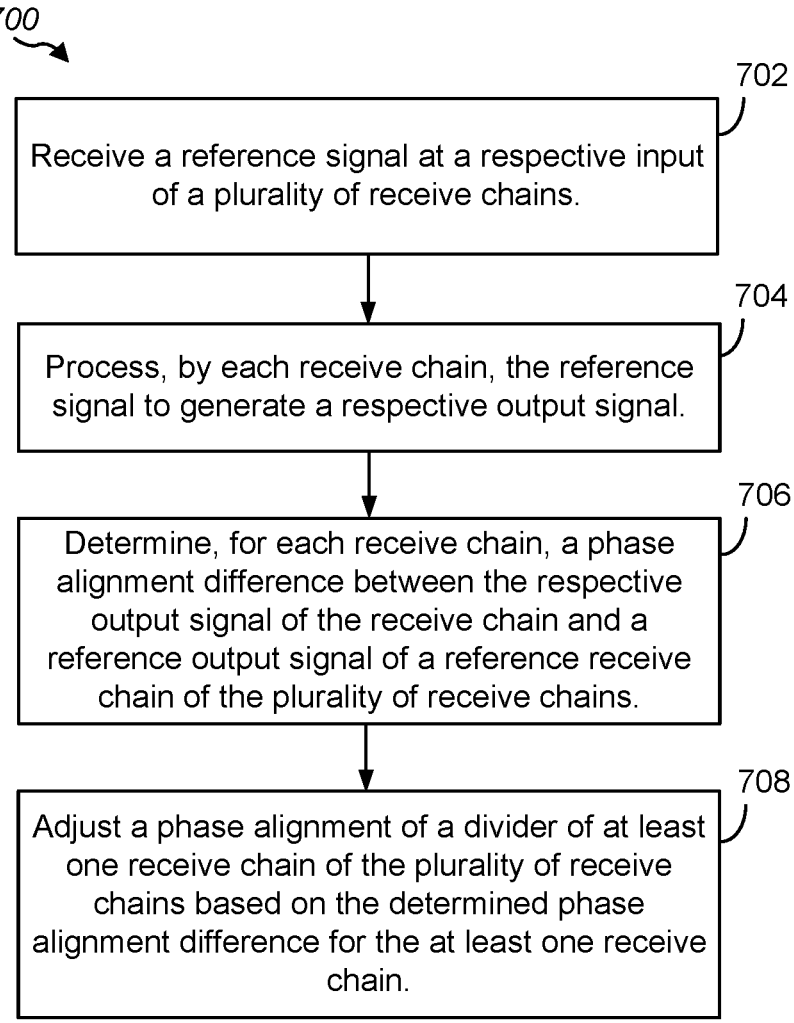

702

Receive a reference signal at a respective input of a plurality of receive chains.

704

Process, by each receive chain, the reference signal to generate a respective output signal.

706

Determine, for each receive chain, a phase alignment difference between the respective output signal of the receive chain and a reference output signal of a reference receive chain of the plurality of receive chains.

708

Adjust a phase alignment of a divider of at least one receive chain of the plurality of receive chains based on the determined phase alignment difference for the at least one receive chain.

*FIG. 7*

800

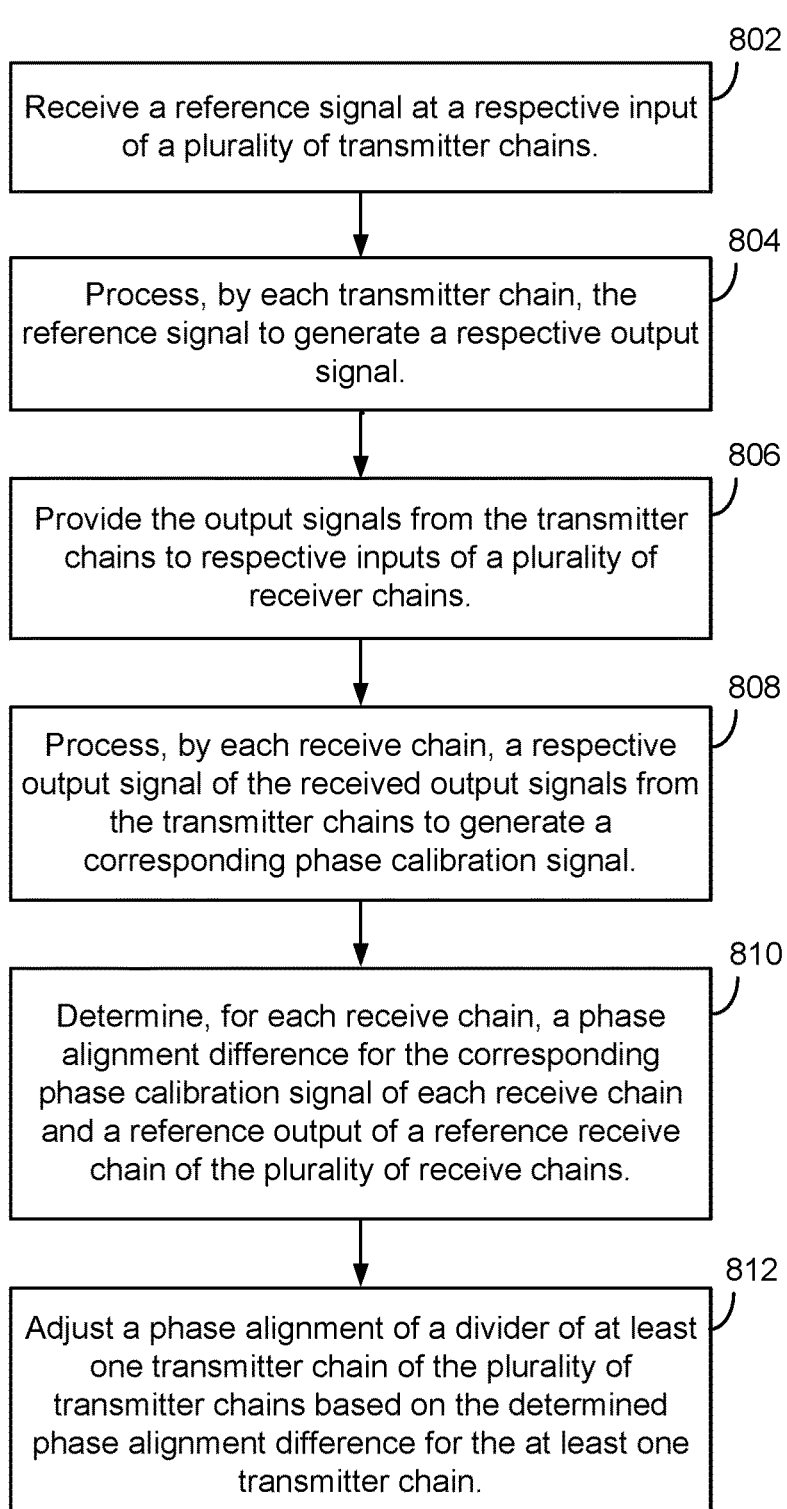

802

Receive a reference signal at a respective input of a plurality of transmitter chains.

804

Process, by each transmitter chain, the reference signal to generate a respective output signal.

806

Provide the output signals from the transmitter chains to respective inputs of a plurality of receiver chains.

808

Process, by each receive chain, a respective output signal of the received output signals from the transmitter chains to generate a corresponding phase calibration signal.

810

Determine, for each receive chain, a phase alignment difference for the corresponding phase calibration signal of each receive chain and a reference output of a reference receive chain of the plurality of receive chains.

812

Adjust a phase alignment of a divider of at least one transmitter chain of the plurality of transmitter chains based on the determined phase alignment difference for the at least one transmitter chain.

*FIG. 8*

DIVIDER PHASE ALIGNMENT AMONG MULTIPLE TRANSMIT AND RECEIVE CHAINS

TECHNICAL FIELD

Aspects of the present disclosure relate generally to wireless communication systems, and more particularly, to radio frequency (RF) processing circuitry for wireless communication systems. Some features may enable and provide improved communications, including improved operation of RF transceivers, such as for local oscillator or divider phase alignment among multiple transmit or receive chains.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include several components. These components may include wireless communication devices, such as base stations (or eNodeBs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Modern wireless communication networks are sophisticated networks that involve operation on multiple frequencies and multiple frequency ranges. RF signals in different frequencies and ranges may use different components or different configurations of components to support a device operating on these wireless communication networks and maintain high signal integrity and high bandwidth across a range of possible network conditions. The duplication of components and number of supported configurations presents challenges in designing RF systems for the UEs and BSs operating on wireless communication networks.

Advanced beamforming systems and multiple input, multiple output (MIMO) systems (e.g., massive MIMO systems) utilize many transmit chains to transmit multiple transmissions and/or generate narrow beams, and include many receive chains to receive multiple transmissions and/or receive RF energy from a specific direction (colloquially referred to as generating a receive beam or to receive a beam). For such operations, the transmit chains need to be phase aligned with one another and the receive chains need to be phase aligned with one another. A phase misalignment of only a few degrees between any two transmit chains or any two receive chains may cause errors by distorting the beam and directing the RF energy away from the target or receiving RF energy from the wrong direction (noise), distorting the signal and causing errors.

Phase misalignment among the transmit chains and phase misalignment among the receive chains can be caused by many sources. However, phase misalignment due to local oscillator (LO) signals and/or divider misalignment can cause large amounts of phase misalignment in both transmit and receive chains. For example, when a divider for a particular chain generates a LO signal with a reduction in frequency of four, the phase misalignment caused by divider misalignment or mismatch (e.g., divider flip/flops being out of synchronization) can be 90 or 180 degrees out of phase. Such large phase misalignment can drastically reduce the performance of beamforming operations and MIMO operations or render such completely ineffective. In addition, the divider or LO phase misalignment can occur or develop during operation from noise and interference and from powering up and down the individual chains for normal operations. As some types of beamforming and MIMO devices, such as base station transceivers, may operate for years at a time between rebooting or calibration, such devices may accumulate large phase alignment during operations which can greatly impair operations.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for calibrating transceiver phase includes: receiving a reference signal at a respective input of a plurality of receive chains; processing, by each receive chain, the reference signal to generate a respective output signal; determining, for each receive chain, a phase alignment difference between the respective output signal of the receive chain and a reference output signal of a reference receive chain of the plurality of receive chains; and adjusting a phase alignment of a divider of at least one receive chain of the plurality of receive chains based on the determined phase alignment difference for the at least one receive chain.

In an additional aspect of the disclosure, a wireless communication device includes a processing system that includes processor circuitry and memory circuitry that stores code and is coupled with the processor circuitry. The processing system is configured to cause the wireless communication device to: receive a reference signal at a respective input of a plurality of receive chains; process, by each receive chain, the reference signal to generate a respective output signal; determine, for each receive chain, a phase alignment difference between the respective output signal of the receive chain and a reference output signal of a reference receive chain of the plurality of receive chains; and adjust a phase alignment of a divider of at least one receive chain of the plurality of receive chains based on the determined phase alignment difference for the at least one receive chain.

In an additional aspect of the disclosure, an apparatus includes means for receiving a reference signal at a respective input of a plurality of receive chains; means for processing, by each receive chain, the reference signal to generate a respective output signal; means for determining, for each receive chain, a phase alignment difference between the respective output signal of the receive chain and a reference output signal of a reference receive chain of the plurality of receive chains; and means for adjusting a phase alignment of a divider of at least one receive chain of the plurality of receive chains based on the determined phase alignment difference for the at least one receive chain.

In an additional aspect of the disclosure, a non-transitory computer-readable medium stores instructions that, when executed by a processor, cause the processor to perform operations. The operations include: receiving a reference signal at a respective input of a plurality of receive chains; processing, by each receive chain, the reference signal to generate a respective output signal; determining, for each receive chain, a phase alignment difference between the respective output signal of the receive chain and a reference output signal of a reference receive chain of the plurality of receive chains; and adjusting a phase alignment of a divider of at least one receive chain of the plurality of receive chains based on the determined phase alignment difference for the at least one receive chain.

In one aspect of the disclosure, a method for calibrating transceiver phase includes: receiving a reference signal at a respective input of a plurality of transmitter chains; processing, by each transmitter chain, the reference signal to generate a respective output signal; providing the output signals from the transmitter chains to respective inputs of a plurality of receive chains; processing, by each receive chain, a respective output signal of the received output signals from the transmitter chains to generate a corresponding phase calibration signal; determining, for each receive chain, a phase alignment difference for the corresponding phase calibration signal of each receive chain and a reference output of a reference receive chain of the plurality of receive chains, wherein the phase alignment difference is indicative of transmitter chain phase misalignment; and adjusting a phase alignment of a divider of at least one transmitter chain of the plurality of transmitter chains based on the determined phase alignment difference for the at least one transmitter chain.

In an additional aspect of the disclosure, a wireless communication device includes a processing system that includes processor circuitry and memory circuitry that stores code and is coupled with the processor circuitry. The processing system is configured to cause the wireless communication device to: receive a reference signal at a respective input of a plurality of transmitter chains; process, by each transmitter chain, the reference signal to generate a respective output signal; provide the output signals from the transmitter chains to respective inputs of a plurality of receive chains; process, by each receive chain, a respective output signal of the received output signals from the transmitter chains to generate a corresponding phase calibration signal; determine, for each receive chain, a phase alignment difference for the corresponding phase calibration signal of each receive chain and a reference output of a reference receive chain of the plurality of receive chains, wherein the phase alignment difference is indicative of transmitter chain phase misalignment; and adjust a phase alignment of a divider of at least one transmitter chain of the plurality of transmitter chains based on the determined phase alignment difference for the at least one transmitter chain.

In an additional aspect of the disclosure, an apparatus includes means for receiving a reference signal at a respective input of a plurality of transmitter chains; means for processing, by each transmitter chain, the reference signal to generate a respective output signal; means for providing the output signals from the transmitter chains to respective inputs of a plurality of receive chains; means for processing, by each receive chain, a respective output signal of the received output signals from the transmitter chains to generate a corresponding phase calibration signal; means for determining, for each receive chain, a phase alignment difference for the corresponding phase calibration signal of each receive chain and a reference output of a reference receive chain of the plurality of receive chains, wherein the phase alignment difference is indicative of transmitter chain phase misalignment; and means for adjusting a phase alignment of a divider of at least one transmitter chain of the plurality of transmitter chains based on the determined phase alignment difference for the at least one transmitter chain.

In an additional aspect of the disclosure, a non-transitory computer-readable medium stores instructions that, when executed by a processor, cause the processor to perform operations. The operations include: receiving a reference signal at a respective input of a plurality of transmitter chains; processing, by each transmitter chain, the reference signal to generate a respective output signal; providing the output signals from the transmitter chains to respective inputs of a plurality of receive chains; processing, by each receive chain, a respective output signal of the received output signals from the transmitter chains to generate a corresponding phase calibration signal; determining, for each receive chain, a phase alignment difference for the corresponding phase calibration signal of each receive chain and a reference output of a reference receive chain of the plurality of receive chains, wherein the phase alignment difference is indicative of transmitter chain phase misalignment; and adjusting a phase alignment of a divider of at least one transmitter chain of the plurality of transmitter chains based on the determined phase alignment difference for the at least one transmitter chain.

In an additional aspect, a base station transceiver system includes: a first chip including: a plurality of first receive chains; and first synthesizer circuitry configured to provide one or more first local oscillator (LO) signals to the first receive chains; a second chip including: a plurality of second receive chains; and second synthesizer circuitry configured to provide one or more second LO signals to the second receive chains; one or more oscillators external to the first chip and the second chip and configured to provide an oscillator signal to the first synthesizer circuitry and the second synthesizer circuitry; a reference signal generation circuit configured to selectively provide a common input signal to inputs of the first receive chains of the first chip and the second receive chains of the second chip; and a processor circuit configured to process received signals through the first and second receive chains in response to the common input signal.

In an additional aspect, a base station transceiver system includes: a first chip including: a plurality of first feedback receive chains and a plurality of first transmit chains; and first synthesizer circuitry configured to provide one or more first local oscillator (LO) signals to the first feedback receive chains and the first transmit chains; a second chip including:

a plurality of second feedback receive chains and a plurality of second transmit chains; and second synthesizer circuitry configured to provide one or more second LO signals to the second receive chains and second transmit chains; one or more oscillators external to the first chip and the second chip and configured to provide an oscillator signal to the first synthesizer circuitry and the second synthesizer circuitry; a reference signal generation circuit configured to selectively provide a common input signal to inputs of the first transmit chains of the first chip and the second transmit chains of the second chip; a loopback circuit configured to selectively provide output signals from outputs of the first transmit chains of the first chip and the second transmit chains of the second chip to inputs of the first feedback receive chains of the first chip and the second feedback receive chains of the second chip; and a processor circuit configured to process received signals through the first and second feedback receive chains in response to the common input signal to the first and second transmit chains.

As used herein, a "radio frequency" signal is a signal having a frequency above baseband, which includes, in an example embodiment of a heterodyne receiver, intermediate frequency signals.

As used herein, an "intermediate frequency" signal is a RF signal that has been downconverted from another RF signal to a frequency that is above baseband, such as in an example embodiment of a heterodyne mm Wave transceiver that receives a mmWave RF signal and downconverts the mmWave RF signal to a mmWave IF signal that is further processed, such as through further downconversion, to a lower frequency RF signal or a baseband signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7 is a flow diagram illustrating an example process that supports enhanced phase calibration operations according to one or more aspects.

FIG. 8 is a flow diagram illustrating an example process that supports enhanced phase calibration operations according to one or more aspects.

Like reference numbers and designations in the various drawings indicate like elements.

DETAILED DESCRIPTION

Figure 1:
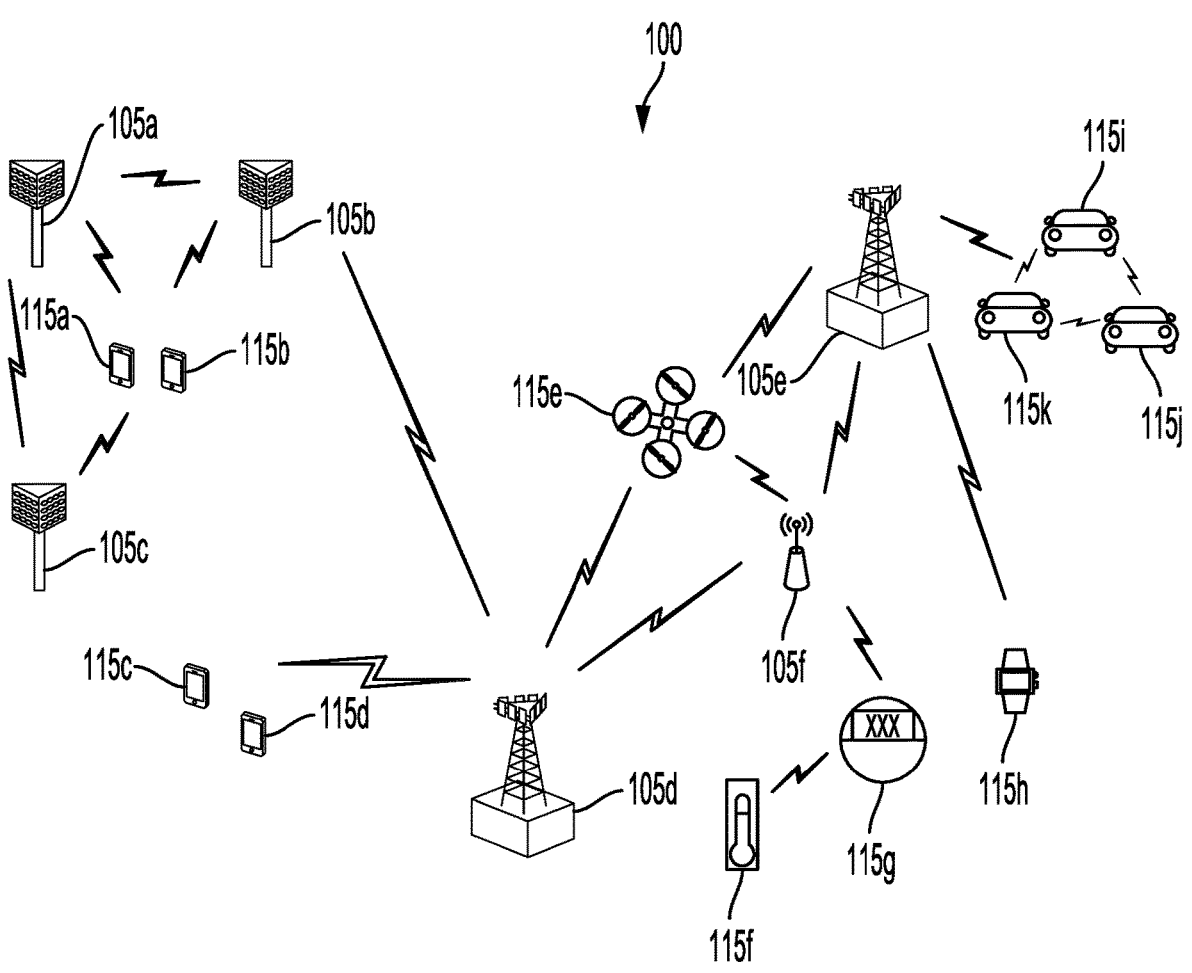
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image processing, including techniques for enhanced phase alignment and calibration operations. The techniques provided herein enable phase misalignment determination and correction among multiple transmit or receive chains. More specifically, the techniques enable phase misalignment determination for local oscillator (LO) signals or dividers of the transmit and receive chains and phase correction for the determined phase alignment. The receive chains may be regular receive chains or feedback receive chains, such as receive chains used for interference cancellation.

The present disclosure utilizes a shared or common reference signal provided to each receive chain or feedback receive chain for use in phase misalignment determination. The shared or common reference signal is phase aligned with respect to each receive chain. A phase estimator is configured to receive the outputs of the receive chains and determine a phase difference between each receive chain and a reference receive chain. As the input signal to each receive chain is a common, phase aligned signal, the phase misalignment (e.g., the gross or coarse phase misalignment) detected by the phase estimator corresponds to LO signal or divider phase misalignment for the receive chains. The phase estimator can then determine one or more phase correction actions and/or implement the phase correction actions to align the phase of the receive chains.

In addition, the present disclosure utilizes a shared or common reference signal provided to each transmit chain for use in phase misalignment determination. The shared or common reference signal is phase aligned with respect to each transmit chain. The transmit chains process the signal and provide or loop back the outputs to corresponding feedback receive chains. The feedback receive chains process the looped back outputs and provide their outputs to the phase estimator. Similarly, the phase estimator is configured to receive the outputs of the feedback receive chains and determine a phase difference between each feedback receive chain and a reference feedback receive chain. As the input signal to each transmit chain is a common, phase aligned signal and the feedback chains may be previously calibrated and aligned, the phase misalignment (e.g., the gross or coarse phase misalignment) detected by the phase estimator corresponds to LO signal or divider phase misalignment for the transmit chains. The phase estimator can then determine one or more phase correction actions and/or implement the phase correction actions to align the phase of the transmit chains.

Particular implementations of the subject matter described in this disclosure may be implemented to realize one or more of the following potential advantages or benefits. In some aspects, the present disclosure provides techniques for LO signal or divider phase calibration. For example, when multiple LO signals or dividers are used, and when external clock signals are used, a transceiver may develop phase misalignment during operation and after initial calibration. The techniques described herein can determine and correct phase misalignment during operation and enable a device to periodically align itself to prevent system downtime to correct misalignment and to enable more accurate beamforming and multiple input, multiple output (MIMO) operations. Additionally, the techniques described herein will reduce errors and improve network performance due to more accurate beamforming and MIMO operations. Furthermore, the techniques described herein may enable the fabrication and successful operation of larger transceivers with more modular designs which can rely on external clock or reference signals with on-chip dividers or LO signal generation.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long-term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology.

Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive MIMO, robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHZ, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cells. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105c.

Figure 2:
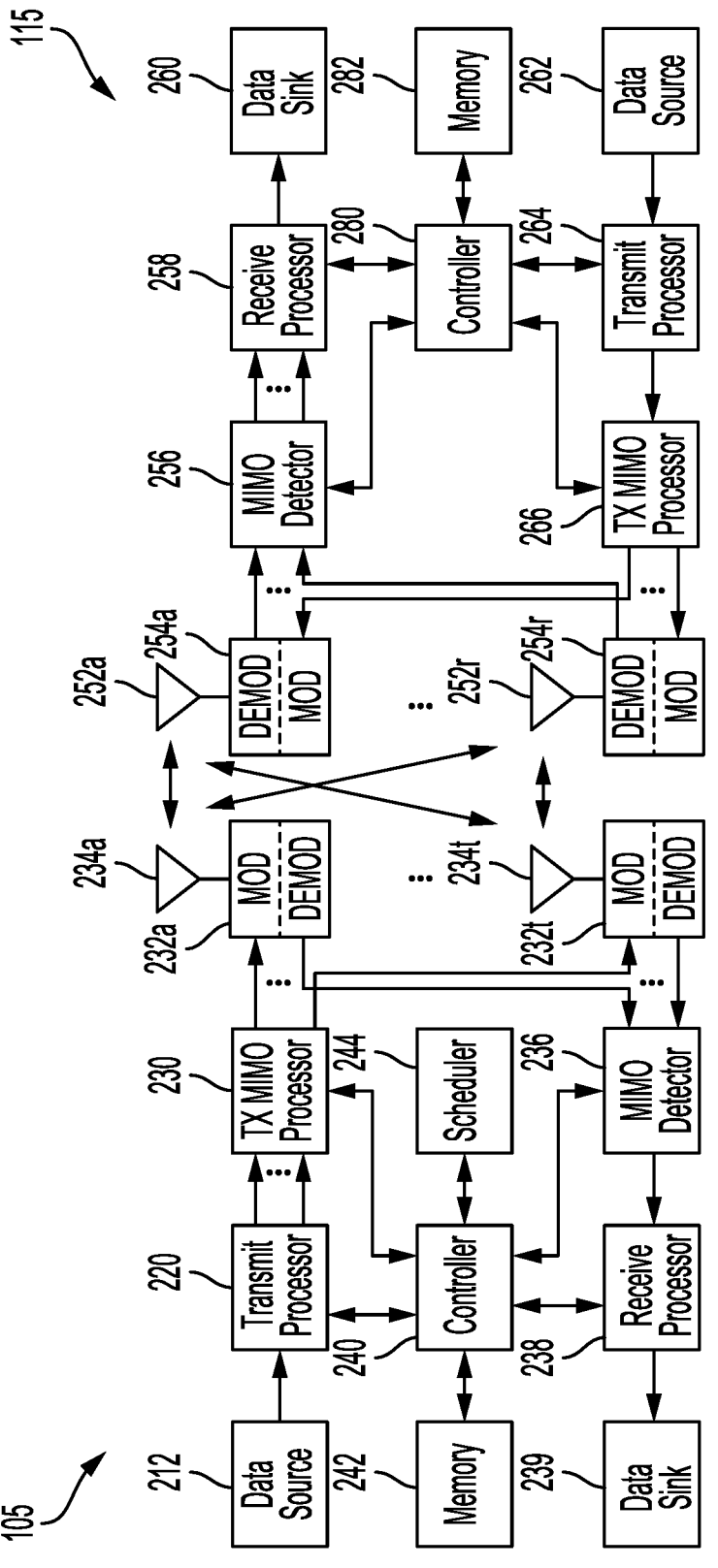
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 5 or FIG. 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
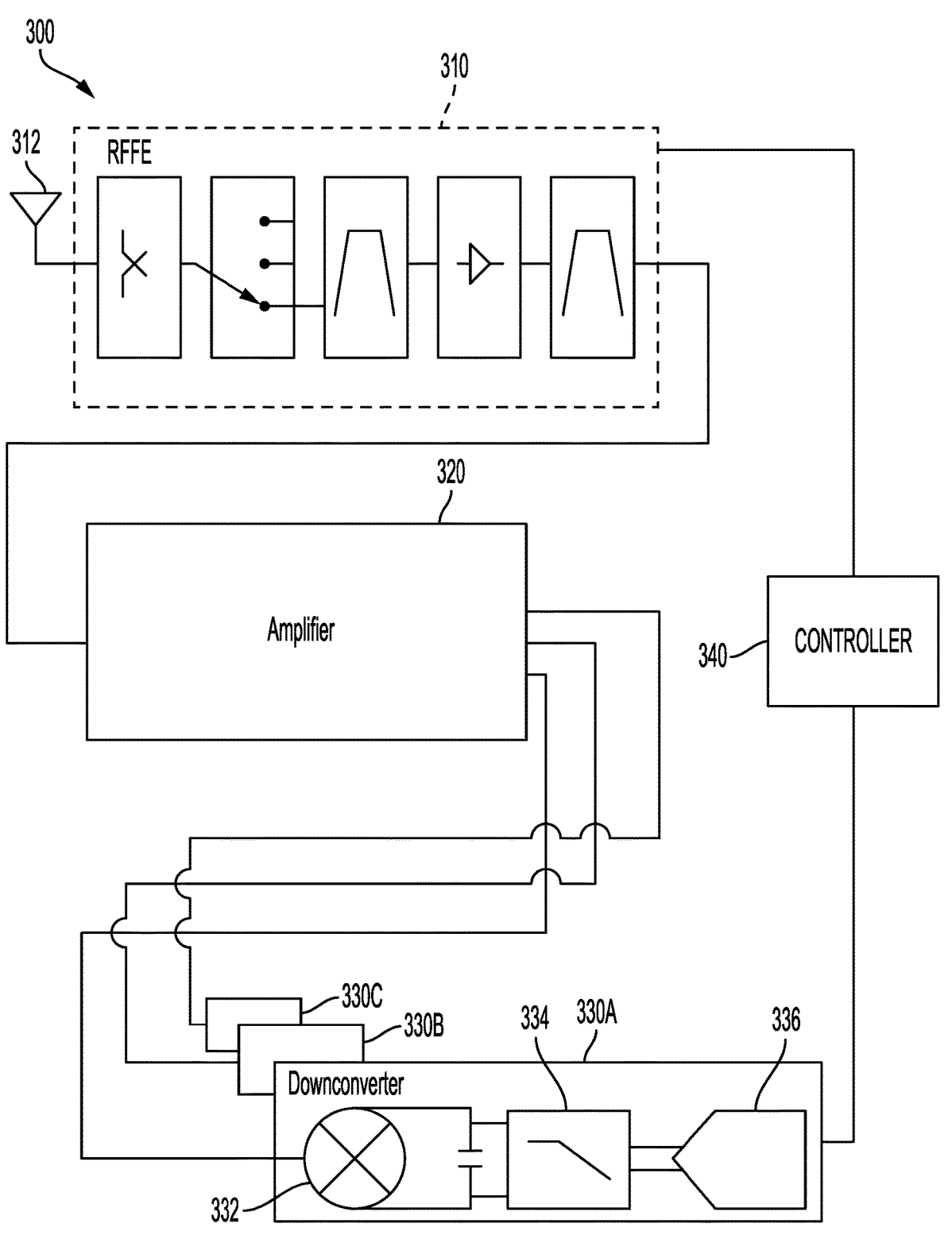
FIG. 3 is a block diagram illustrating a frequency (RF) transceiver according to one or more aspects.

FIG. 3 is a block diagram illustrating a wireless receiver circuit 300 according to one or more aspects. In some embodiments, the receiver circuit 300 may be part of a converged sub-6 Ghz and mm Wave radio frequency (RF) transceiver, a sub-6 GHZ radio frequency (RF) transceiver, or a mmWave radio frequency (RF) transceiver. In some embodiments, portions or all of the RF transceiver of FIG. 3 may be located in a single integrated circuit (IC) sharing a common substrate. The receiver circuit 300 may include an antenna 312 to receive radio frequency (RF) signals, such as a phase antenna array. The antenna 312 is coupled to a RF front-end (RFFE) 310, which may include duplexers, SAW filters, switches, LNAs, and/or other transmit or receive circuits for conditioning signals received from the antenna 312. In some embodiments, the RFFE 310 may include separate circuits for conditioning or otherwise processing sub-6 GHz signals, mmWave signals, satellite signals, and/or other signals. For example, the RFFE 310 may include a first plurality of circuits for conditioning a sub-6 GHz signal for further processing by other circuitry and a second plurality of circuits for conditioning a mm Wave RF signal for further processing by other circuitry. The output of the RFFE 310 in this example may be an input RF signal to other circuitry comprising the conditioned sub-6 GHZ signal and a conditioned mmWave IF signal. The RFFE 310 is coupled to an amplifier 320, such as a low noise amplifier (LNA). The amplifier 320 is coupled to one or more downconverters 330A, 330B, and 330C. Each of the downconverters 330A, 330B, and 330C may include mixers 332, baseband filters (BBFs) 334, and/or analog-to-digital converters (ADCs) 336. The downconverters 330A, 330B, 330C may include one or more harmonic rejection mixers (HRMs). In some embodiments, the amplifier 320 is shared on an IC with one or more of the RFFE 310 and/or the downconverters 330A, 330B, and 330C.

A controller 340 may detect conditions in the RF signal received from the antenna 312 or receive information regarding the carrier configuration from higher levels, such as a MAC layer or network layer. The controller 340 may configure components of the receiver circuit 300 to activate, deactivate, or control portions of the receiver circuit 300 to process an input RF signal. In some embodiments, the controller 340 configures components to reduce interference between bands within the receiver circuit 300. In some embodiments, the controller 340 may configure phase alignment determination and/or adjustment operations in one or more processing paths of mixers within the downconverters 330A, 330B, and 330C, as described further with reference to FIGS. 4-10.

Figure 4:
FIG. 4 is a diagram illustrating a wireless receiver that supports enhanced phase calibration operations according to one or more aspects.

FIG. 4 is a circuit diagram illustrating a wireless receiver circuit 400 according to one or more aspects. In some embodiments, the wireless receiver circuit 400 may be part of a sub-6 GHz radio frequency (RF) transceiver, a converged sub-6 Ghz and mmWave radio frequency (RF) transceiver, or a mmWave radio frequency (RF) transceiver. In some embodiments, portions of the RF transceiver of FIG. 4 may be located in a single integrated circuit (IC) sharing a common substrate, and each portion may be coupled to each other and to a PCB.

The wireless receiver circuit 400 includes a plurality of receive chains 402-408 and a phase estimator 410. In the example of FIG. 4, four receive chains, a first receive chain 402, a second receive chain 404, a third receive chain 406 and a fourth receive chain 408, are illustrated grouped into two sets of receive chains, a first group 412 and a second group 414, for simplicity. The wireless receiver circuit 400 may include many more receive chains and groups of receive chains. For example, in a particular implementation, the wireless receiver circuit 400 may include 8 groups of 8 receive chains for a total of 64 receive chains. Each group of receive chains, such as the first and second groups 412 and 414 may include or correspond to a separate chip or portion of chip which is implemented on a PCB.

The receive chains 402-408 of the wireless receiver circuit 400 may include or correspond to receive chains, feedback receive chains, or a combination thereof. Although the example FIG. 4 is directed to an example of receive (RX) chains, in other implementations the receive chains may be feedback receive (FBRX) chains and have similar or identical operation.

Each receive chain 402-408 includes a corresponding amplifier, mixer, and divider. For example, the first receive chain 402 includes a first amplifier 422, a first mixer 424, and a first divider 426, the second receive chain 404 includes a second amplifier 432, a second mixer 434, and a second divider 436, the third receive chain 406 includes a third amplifier 442, a third mixer 444, and a third divider 446, and the fourth receive chain 408 includes a fourth amplifier 452, a fourth mixer 454, and a fourth divider 456.

Each receive chain 402-408 may be configured to receive multiple types of input signals. For example, each receive chain 402-408 may be configured to receive a corresponding respective received signal from a corresponding antenna (not shown) at a corresponding input, Rx0-Rx64. Additionally, each receive chain 402-408 is configured to receive a common reference signal, reference signal 460. For example, each group 412, 414 of receive chains 402-408 may include a common input for the common reference signal.

As illustrated in the example of FIG. 4, the first group 412 includes a first common input 416 to receive the reference signal 460 and the second group 414 includes a second common input 418 to receive the reference signal 460. The common inputs 416 and 418 may be connected to the antenna inputs for each receive chain of the respective group and provide the reference signal 460 to each receive chain via the respective antenna inputs (e.g., Rx0-Rx64). To illustrate, the first common input 416 provides the received reference signal 460 to the first receive chain 402 and the second receive chain 404, and the second common input 418 provides the received reference signal 460 to the third receive chain 406 and the fourth receive chain 408.

The received communication signals and reference signal 460 may include or correspond to different types of signals or waves. For example, the received signals from antennas may include or correspond to received RF or analog signals while the reference signal 460 may include or correspond to a digital signal or square wave.

The amplifier, amplifiers 422, 432, 442, 452, of each receive chain 402-408 may include or correspond to a low noise amplifier or other type of amplifier in a receive chain. In some implementations, the amplifier may include or correspond to a linear amplifier. The amplifier is configured to amplify received input signals, such as the received RF signals from a corresponding antenna or the reference signal 460. In some implementations, the reference signal may be configured to pass around the amplifier (e.g., through bypass circuitry) or to go through the amplifier in a different mode than received wireless communication signals. For example, the amplifier may amplify or process the reference signal 460 to a lesser extent than received signals or not at all, such as in a zero gain mode.

The mixer, mixers 424, 434, 444, 454, of each receive chain 402-408 may include or correspond to a frequency mixer or multiplier configured to generate a new signal, including or having one or more new frequencies, based on two signals applied to it, such as the different frequencies of the two signals applied to it. Each mixer is configured to generate an output based on a corresponding pair of an input signal and a local oscillator signal. In the example of FIG. 4, the input signal may include or correspond to received signals from a corresponding antenna or a common reference signal, reference signal 460 common to all receive chains, and the local oscillator signal may include or correspond to an adjusted (e.g., divided or reduced) local oscillator signal that is received from an external local oscillator (e.g., external phase locked loop (PLL)) and adjusted based on a corresponding on-chip divider. The mixer may include or correspond to mixer, a single balanced mixer, or a double balanced mixer. The mixer may include one or more circuit components such as transistors or diodes to generate the output.

With this architecture of each receive chain having a corresponding divider or LO signal, the wireless receiver circuit 400 may accumulate a phase difference or misalignment between dividers over time. For example, the dividers may experience a phase misalignment due to powering up and down individual receive chains during operation (e.g., MIMO/OFDM operations), from external interference (e.g., noise, RF energy, sunburst, cosmic ray, etc.), from a power supply (power supply ringing), etc., or a combination thereof.

In FIG. 4, one or multiple external PLLs or clock signals may be used. For example, a single external PLL or voltage controlled oscillator (VCO) output may be used for each group (e.g., chip) of receive chains. As another example, each group of receive chains may have a dedicated external PLL or VCO.

The divider, dividers 426, 436, 446, 456, of each receive chain 402-408 may include or correspond to a frequency divider. The divider of each receive chain 402-408 is arranged as a local oscillator (LO) driven divider (often referred to as LO dividers) and is configured to reduce or divide a frequency of a received LO signal and provide the reduced LO signal to a corresponding mixer. Alternatively, the signal received at the divider may include or correspond to an external clock signal, such as output of a PLL or VCO, and the output from the divider may include or correspond to a LO signal.

The phase estimator 410 is configured to receive outputs from the receive chains and to determine a relative phase difference between the output of the receive chains. For example, the phase estimator 410 is configured to receive a corresponding output from each receive chain of the plurality of receive chains 402-408, such as a respective mixer thereof.

Although the phase estimator 410 is coupled to the output of the respective mixer of each receive chain and configured to receive a respective output of each receive chain in FIG. 4, the output of receive chain may bypass the phase estimator 410 in some implementations, such as by the use of switches, traces, or other bypass circuitry. For example, during wireless communication, the output of each receive chain may physically bypass the phase estimator 410 and be directed to further RF processing or decoding, or the output of each receive chain may pass through the phase estimator 410 without the phase estimator 410 processing the signal or with the phase estimator 410 processing the signal for non-divider generated phase alignment.

Alternatively, the phase estimator 410 may be selectively coupled to the output of each receive chain during certain operating mode, such as during calibration modes or divider alignment modes, through the use of additional switches and traces (not shown).

The phase estimator 410 may include or correspond to a processor or one or more correlators (e.g., correlator circuitry), and the phase estimator 410 is configured to determine phase misalignment in received signals, referred to as phase calibration signals. For example, the phase estimator 410 is configured to determine gross phase misalignment indicative of divider or LO phase misalignment, and may also be configured to determine fine phase misalignment.

The reference signal 460 may include or correspond to a common external reference signal or phase synchronization signal. For example, the reference signal 460 may include or correspond to digital signal generated by an oscillator. To illustrate, the reference signal 460 may include or correspond to a clock signal and have a square wave. In some implementations, the reference signal 460 is generated by a crystal oscillator. In other implementations, the reference signal 460 is generated by a PLL or VCO. The reference signal 460 is common to each receive chain and is phase aligned across all of the receive chains.

In some implementations, the reference signal 460, such as fundamental frequency thereof, may be outside of a band of operation of the wireless receiver circuit 400. For example, the wireless receiver circuit 400 may operate in multiple bands in different frequency spectrums, such as FR1 and FR2, and the reference signal 460 when originally generated may be outside of this range. As an illustrative example, the reference signal 460 when generated may have a frequency below one or more of the frequencies of the operating bands. The reference signal 460 may be processed by the wireless receiver circuit 400 or by external circuitry to adjust the signal or a frequency thereof.

In a particular implementation, the reference signal 460 may have a frequency of 153.6 MHz and be a square wave, having multiple odd harmonic frequencies. More generally, a particular odd harmonic or harmonics (e.g., target harmonic) of the reference signal 460 that falls within the RF operating bands of the wireless receiver circuit 400 may be used by the wireless receiver circuit 400 for phase calibration. As illustrative examples, a fifth harmonic may be used for some low bands and a thirty-third harmonic may be used for some NR unlicensed (NRU) bands. Even though the harmonic frequencies of harmonics of the reference signal 460 may be slightly out of phase with the fundamental frequency of the reference signal 460, the target harmonic(s) of each reference signal 460 will be phase aligned across all receive chains.

In such implementations, where the fundamental frequency of the reference signal 460 is outside of the target band of operation or calibration, the reference signal 460 may be processed, such as by one or filters (e.g., high pass filters, baseband filters, or a combination thereof), to filter out the fundamental frequency and optionally other lower order harmonics. These filters may be on the wireless receiver circuit 400 or external to it. An example of such circuitry is shown and described with reference to the loopback circuitry 600 of FIG. 6. Alternatively, the phase estimator 410 may be configured to determine a phase misalignment, such as by single point (SP) discrete Fourier transform (DFT) (SPDFT) operations, for a particular harmonic signal of the reference signal 460 from a received phase calibration signal (generated based on the reference signal 460 and corresponding harmonics). For example, when (aligned) SPDFT operations are performed on a clock edge (e.g., same clock edge for each received signal for phase calibration (phase calibration signal), the SPDFT operations may generate an output indicative of a phase difference for the particular target harmonic even when other harmonics and/or the fundamental frequency are present. These aligned SPDFT operations may also be referred to as synchronized SPDFT operations.

Although not shown for clarity, the wireless receiver circuit 400 may include one or more additional components, such as additional RF front end components of filters, resistors, capacitors, inductors, switches traces, etc. The wireless receiver circuit 400 is configured to receive the reference signal 460 and selectively provide the reference signal 460 to each receive chain. Additionally, in some implementations, the wireless receiver circuit 400 is configured to process the reference signal 460 on-chip or receives a processed version of the reference signal 460, such as filtered and/or aligned version of the reference signal.

Prior to operation, the wireless receiver circuit 400 may be calibrated for phase alignment, such as during factory calibration, when first placed into operation (e.g., initial installation), and/or when reset, rebooted, or reconfigured after initial installation. The wireless receiver circuit 400 may be part of a base station or other network device, such as a base station transceiver, and may operate continuously for a long duration, such as multiple years, without fully powering down or being reset.

After calibration and during operation, the wireless receiver circuit 400 may perform wireless communication operations to engage in beamformed or MIMO based wireless transmission and reception. For example, the wireless receiver circuit 400 may receive wireless communication signals from a plurality of corresponding antennas (not shown) and process the received signals using one or more of the plurality of receive chains of the wireless receiver circuit 400. To illustrate, the wireless receiver circuit 400 may receive and process MIMO signals, OFDM signals, etc. Over time, the dividers of the one or more receive chains of the wireless receiver circuit 400 may develop a phase misalignment with each other. Specifically, the dividers of one or more of the receive chain may develop a phase mismatch with at least one other receive chain.

The wireless receiver circuit 400 may periodically perform calibration operations for divider phase misalignment to identify and correct divider phase misalignment between receive chains. The wireless receiver circuit 400 may perform the calibration operations periodically based on time, based on one or more conditions (e.g., trigger conditions), or both. For example, the wireless receiver circuit 400 may perform calibration operations every x duration, such as every minute, hour, day, month, etc. Additionally, or alternatively, the wireless receiver circuit 400 may perform calibration operations in response to a determination that a condition (e.g., trigger condition) has been satisfied. These conditions may include or correspond to a threshold number of errors, a threshold number of increase in errors, a threshold power supply variation, a threshold amount of external RF interference/noise, an external request, etc.

During calibration operations, the wireless receiver circuit 400 receives a common external reference signal and provides the common external reference signal to a plurality of receive chains of the wireless receiver circuit 400. For example, the wireless receiver circuit 400 receives the reference signal 460 (e.g., from an external source, such as a shared crystal oscillator) and provides the reference signal 460 to each receive chain of the wireless receiver circuit 400 or to each receive chain of a group (e.g., each chip) of receive chains of the wireless receiver circuit 400. In a particular implementation, the reference signal 460 is provided to the receive chains from the external source via loopback circuitry, such as the loopback circuitry of FIG. 6.

Each receive chain that receives the reference signal 460 is configured to provide the reference signal 460 to its corresponding amplifier. For example, the first receive chain 402 receives the reference signal 460 via a first common input 416 (common with the second chain receive chain 404 and other receive chains of the first group 412) and provides the reference signal 460 to an input of the first amplifier 422, and the second receive chain 404 receives the reference signal 460 at the first common input 416 and provides the reference signal 460 to an input of the second amplifier 432. Similarly, the third receive chain 406 receives the reference signal 460 at a second common input 418 (common with the fourth chain receive chain 406 and other receive chains of the second group 414) and provides the reference signal 460 to an input of the third amplifier 442, and the fourth receive chain 408 receives the reference signal 460 at the second common input 418 and provides the reference signal 460 to an input of the fourth amplifier 452.

In this example, the amplifiers 422, 432, 442, and 452 are configured to process (e.g., amplify) the received reference signal 460 and generate an output, such as an amplified reference signal (amplified version of the reference signal). Alternatively, the amplifiers 422, 432, 442, and 452 may not process or amplify the reference signal (e.g., process the reference signal in a zero gain mode) or the receive chains may have circuitry (e.g., traces and switches) to bypass the amplifiers 422, 432, 442, and 452.

In addition, each receive chain that receives the reference signal 460 further receives an external clock signal or local oscillator signal at a corresponding divider of the receive chain. For example, the first receive chain 402 receives a first LO signal 462 at an input of a first divider 426 and the second receive chain 404 receives a second LO signal 464 at an input of a second divider 436. Similarly, the third receive chain 406 receives a third LO signal 466 at an input of a third divider 446, and the fourth receive chain 408 receives a fourth LO signal 468 at an input of a fourth divider 456.

As described above, the LO signals 462-468 may be the same signal, that is generated by the same on-chip LO or a single external LO (external PLL). Alternatively, the LO signals may be different LO signals generated by different LO devices on-chip or externally. When generated by multiple LO devices, the LO signals may be aligned or may correspond to aligned external LO signals from multiple PLLs. Although referred to as LO signals, the LO signals received at the dividers may also be referred to as external clock signals which are converted into LO signals by the dividers.

The divider of each receive chain processes the received LO signal to generate an output signal, such as divided LO signal, with an adjusted or reduced frequency. The divider may be configured to reduce the frequency of the input LO signal by a factor of n, referred to a rank of the divider. For example, the divider may be configured to reduce the frequency of the received LO signal by 2, 3 4, 5, 6, 8, 12, 16, etc.

For example, the first divider 426 of the first receive chain 402 generates a first divided LO signal 472 based on the received first LO signal 462 and provides the first divided LO signal 472 to an input (e.g., second input) of the first mixer 424 of the first receive chain 402. The second divider 436 of the second receive chain 404 generates a second divided LO signal 474 based on the received second LO signal 464 and provides the second divided LO signal 474 to an input (e.g., second input) of the second mixer 434 of the second receive chain 404. The third divider 446 of the third receive chain 406 generates a third divided LO signal 476 based on the received third LO signal 466 and provides the third divided LO signal 476 to an input (e.g., second input) of the third mixer 444 of the third receive chain 406. The fourth divider 456 of the fourth receive chain 408 generates a fourth divided LO signal 478 based on the received fourth LO signal 468 and provides the fourth divided LO signal 478 to an input (e.g., second input) of the fourth mixer 454 of the fourth receive chain 408. Although referred to as divided LO signals, the divided LO signals output by the dividers may also be referred to as LO signals for driving the mixers.

In each receive chain, the reference signal 460 (or amplified reference signal) is provided to an input of the corresponding mixer of the receive chain. For example, an input (e.g., first input) of the first mixer 424 of the first receive chain 402 receives the reference signal (or amplified reference signal), and an input (e.g., first input) of the second mixer 434 of the second receive chain 404 receives the reference signal 460 (or amplified reference signal). Similarly, an input (e.g., first input) of the third mixer 444 of the third receive chain 406 receives the reference signal 460 (or amplified reference signal), and an input (e.g., first input) of the fourth mixer 454 of the fourth receive chain 408 receives the reference signal 460 (or amplified reference signal). All of these reference signals 460 (or amplified/processed versions of the reference signal 460) received at the different mixers of the receive chains (e.g., mixers 424, 434, 444, and 454) will have essentially or substantially the same phase as they all correspond to a common external reference signal or phase aligned synchronization signal.

In each receive chain, the mixer of the respective receive chain processes the received input signals (reference and LO signals) to generate an output signal which is provided to phase estimator 410. For example, the first mixer 424 of the first receive chain 404 generates a first phase calibration signal 482 based on the reference signal 460 and the first divided LO signal 472, and the second mixer 434 of the second receive chain 404 generates a second phase calibration signal 484 based on the reference signal 460 and the second divided LO signal 474. Similarly, the third mixer 444 of the third receive chain 406 generates a third phase calibration signal 486 based on the reference signal 460 and the third divided LO signal 476, and the fourth mixer 454 of the fourth receive chain 408 generates a fourth phase calibration signal 488 based on the reference signal 460 and the fourth divided LO signal 478.

One or more of the divided LO signals 472-478 (or LO signals) may not be phase aligned with one another due to a phase mismatch between more of the dividers 426, 436, 446, and 456. Accordingly, one or more the phase calibration signals 482-488 may also have a phase mismatch with one another because they were generated based on respective LO signals that have a phase misalignment.

The phase estimator 410 receives the plurality of outputs from the respective mixers of the receive chains and determines a phase mismatch for each receive chain. For example, the phase estimator 410 receives a plurality of phase calibration signals 482-488 and determines or sets one phase calibration signal as a reference phase calibration signal. The phase estimator 410 may then determine a phase difference between each phase calibration signal and the reference phase calibration signal. The phase estimator 410 may then generate one or more phase adjustment outputs indicative of a phase alignment or misalignment for one or more of the receive chain. Each phase adjustment output may indicate a particular phase adjustment for a particular divider of a receive chain.

To illustrate, the phase estimator 410 may set the first phase calibration signal 482 (or corresponding path as a reference path) as a reference phase calibration signal and determine a first phase difference between the reference phase calibration signal (i.e., the first phase calibration signal 482 in this example) and the second phase calibration signal 484. The phase estimator 410 may then determine a phase difference between the reference phase calibration signal (i.e., the first phase calibration signal 482 in this example) and one or more other received phase calibration signal from the one or more other receive chains, such as the third phase calibration signal 486 and the fourth phase calibration signal 488. As phase is useful in relative terms, the dividers are only aligned to have a relative phase alignment and not an absolute phase alignment. Thus, it does not matter if the reference path is actually "misaligned" itself, such as from a prior or initial calibration or phase setting.

Alternatively, instead of having one set reference path or signal, the phase estimator 510 may determine a reference path and signal or correct phase setting/value for each calibration process, such as to limit or reduce an amount of phase adjustments. To illustrate, the phase estimator 410 may determine a phase of each received phase calibration signal 482-488, and then determine a most common or most similar phase, e.g., a median phase value or setting, of the received phase calibration signals 482-488 by a comparison or sorting process. The phase estimator 410 may then use one of the phase calibration signals with the median value or setting as the reference path or determine to adjust dividers corresponding to the other phase calibration signals that differ from the median value or setting.

In some implementations, the phase estimator 410 may employ quantization in determining a phase adjustment. For example, the phase estimator 410 may determine an actual phase offset from the reference phase calibration signal is 93 degrees for a particular phase calibration signal. The phase estimator 410 may quantize this determined phase offset (93 degree) to generate a quantized phase offset, such as 90 degrees, based on quantization factor or set of quantized values. For example, the phase estimator 410 may be configured or programmed with a set of quantized values to use for phase adjustments or with a quantization factor used to determine a set of quantized values. The set of quantized values and/or the quantization factor may be associated with or correspond to a rank of the divider. As the divider may reduce the input LO signal by a discrete factor, the phase difference (mismatch) between divided LO signals due to phase misalignment of the dividers corresponds to a discrete value. As an illustrative example, for a divider with a rank of 4, the divider caused phase misalignment will correspond to a value of 360 degrees divided by 4, or 0, 90, 180, or 270. Thus, the phase estimator 410 may be configured to determine and/or selected a quantized phase adjustment value based on the closest or most similar quantized phase adjustment value to the determined phased adjustment. In the above example, the 93 degree phase misalignment may be caused by multiple factors, such as a 90 degree phase misalignment from receive chain divider misalignment and a 3 degree phase misalignment from other receive chain circuitry, the reference signal 460, input LO signals, etc., or a combination thereof.

The operations in the phase estimator 410 may be performed by a processor employing fast Fourier transform (FFT) operations or by a correlator (e.g., a digital phase correlator). For example, a processor or other dedicated computational circuitry may be configured to perform single SPDFT operations on the received phase calibration signal to determine a relative phase difference (mismatch) between the received phase calibration signals and the reference phase calibration signal.

As another example, the correlator may be configured to compare two received phase calibration signals to determine a relative phase difference (mismatch) between a particular received phase calibration signal and the reference phase calibration signal. The correlator may then compare a second particular received phase calibration signal and the reference phase calibration signal to determine a second relative phase difference (mismatch). Alternatively, multiple correlators may be employed to process each received phase calibration signal with the identified reference phase calibration signal in parallel.

After performing a phase calibration process, the phase estimator 410 may be configured to generate an output signal indicative of a result of the calibration process. For example, if no phase misalignment is detected, the phase estimator 410 may generate an output signal indicating no adjustment needed. Alternatively, the phase estimator 410 may not generate an output signal, such as a phase adjustment signal 490, when no adjustment is needed. For calibrations where one or more phase misalignments are detected, the phase estimator 410 may be configured to generate one or more phase adjustment signals 490 indicative of one or more phase misalignments, or may be configured to generate a single phase adjustment signal 490 that indicates multiple phase adjustments.

In some implementations, the phase estimator 410 may be configured to provide the phase adjustment signal(s) 490 to external phase adjustment circuitry (not shown), such as controller or divider control circuitry. Alternatively, the phase estimator 410 may be further configured to adjust a phase of the dividers of the receive chains itself based on the phase adjustment signal(s) 490. For example, the phase estimator 410 may include or be configured to control a rotator (e.g., phase rotator or phase rotation circuitry) that is configured to adjust a phase rotation of one or more dividers of the wireless receiver circuit 400. The rotator (not shown) may be located at an output of each receive chain or coupled to an output of each receive chain, or may be located along the input path of the LO signal to the divider or along the output path from the divider.

Accordingly, the wireless receiver circuit 400 may be able to correct LO divider phase misalignment after initial calibration and during operation. The wireless receiver circuit 400 may be able to periodically calibrate itself (e.g., receive chains and/or feedback receive chains) during normal operation without powering down or entering a maintenance mode. By properly aligning LO divider phase, the wireless receiver circuit 400 may be able to more efficiently and effectively (e.g., with less errors) perform beamforming based wireless communications. For example, large numbers of transmit and receive chains may be properly phase aligned to generate beams and receive RF energy with increased directional and focused energy (narrower beams). Additionally, the wireless receiver circuit 400 may be able to communicate more efficiently and with less errors in massive MIMO operations. Accordingly, wireless communication performance and experience may be increased due to the increases in beamforming performance and reductions in beam generation errors due to phase misalignment.

Figure 5:
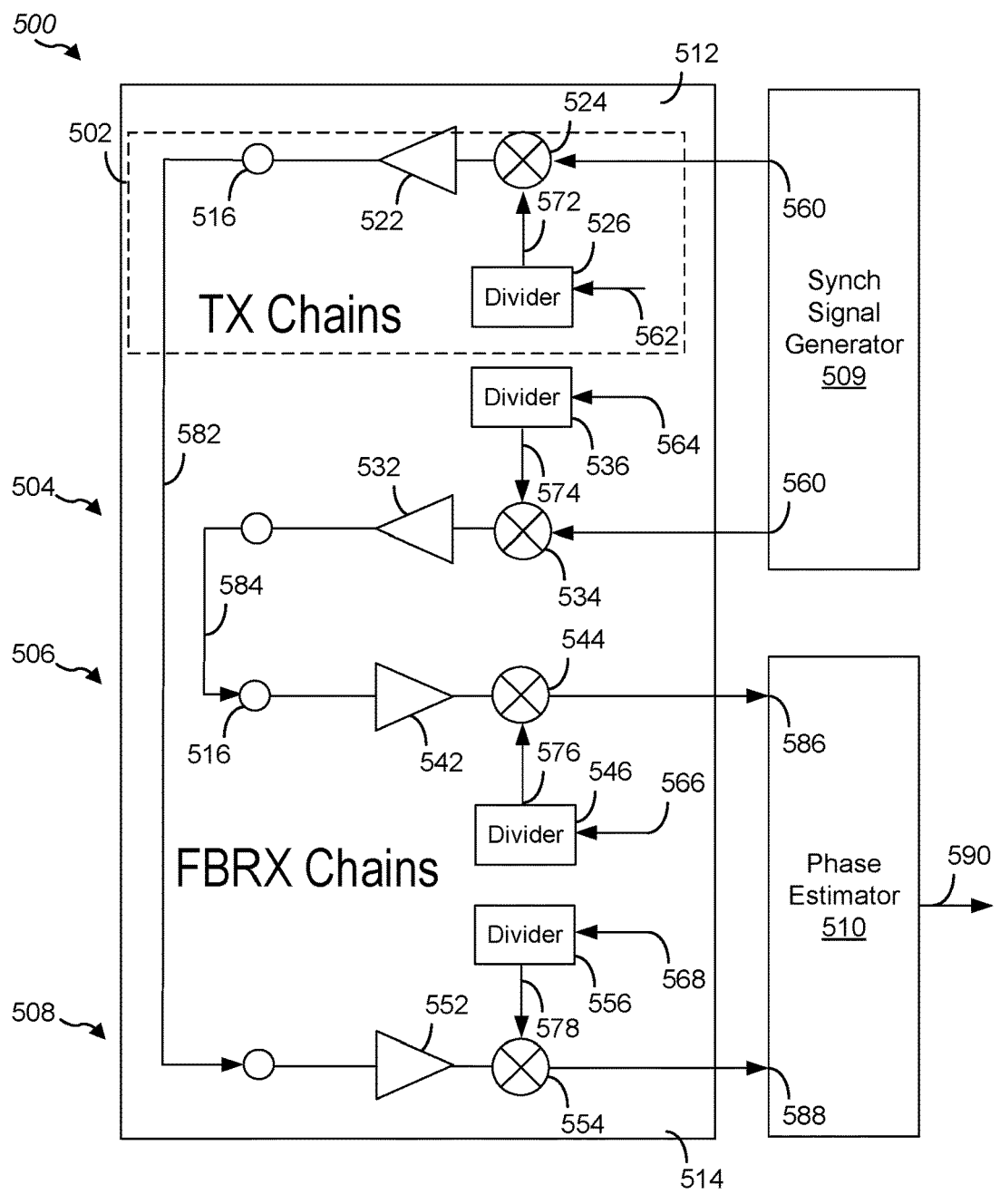
FIG. 5 is a diagram illustrating a wireless transceiver that supports enhanced phase calibration operations according to one or more aspects.

FIG. 5 is a circuit diagram illustrating a wireless transceiver circuit 500 according to one or more aspects. In some embodiments, the wireless transceiver circuit 500 may be part of a sub-6 GHz radio frequency (RF) transceiver, a mmWave radio frequency (RF) transceiver, or a converged sub-6 Ghz and mmWave radio frequency (RF) transceiver. In some embodiments, portions of the RF transceiver of FIG. 5 may be located in a single integrated circuit (IC) sharing a common substrate.

The wireless transceiver circuit 500 includes a plurality of transmit chains 502 and 504, a plurality of feedback receive chains 506 and 508, a synchronization signal generator 509, and a phase estimator 510. The wireless transceiver circuit 500 may further include loopback circuitry 516. Alternatively, the loopback circuitry 516 may be included the substrate (e.g., PCB) that includes or is coupled to the wireless transceiver circuit 500. Although not shown, the wireless transceiver circuit 500 may include one more receive chains of the wireless receiver circuit 400 of FIG. 4.

In the example of FIG. 5, two transmit chains and two feedback receive chains are illustrated, a first transmit chain 502, a transmit receive chain 504, a first feedback receive chain 506, and a second feedback receive chain 508. The transmit chains and feedback receive chains are arranged in pairs such that each transmit chain has a corresponding feedback receive chain. To illustrate, a particular transmit chain and a particular feedback receive chain are coupled together such that an output of the transmit chain is provided (e.g., looped back) to an input of the feedback receive chain. In the example, of FIG. 5, the first transmit chain 502 provides its output to the second feedback receive chain 508 and the second transmit chain 504 provides its output to the first feedback receive chain 506.

The transmit chains 502 and 504 may be grouped into sets of transmits chains as described with reference to the receive chains of FIG. 4 and may correspond to a transmitter section 512 (one or more transmit chips) of the wireless transceiver circuit 500. The feedback receive chains 506 and 508 may be grouped into sets of feedback receive chains as described with reference to FIG. 4 and may correspond to a receiver section 514 (one or more receiver chips) of the wireless transceiver circuit 500. Although two pairs of transmit and feedback receive chains are shown for simplicity, the wireless transceiver circuit 500 may include more transmit and/or feedback receive chains. For example, in a particular implementation, the wireless transceiver circuit 500 may include 8 groups of 8 transmit chains for a total of 64 transmit chains. Each group of transmit chains may include or correspond to a separate chip or portion of chip which is implemented on a PCB. Additionally, or alternatively, the wireless transceiver circuit 500 may include 8 groups of 8 feedback receive chains for a total of 64 feedback receive chains. Each group of feedback receive chains may include or correspond to a separate chip or portion of chip which is implemented on a PCB. The feedback receive chains may be on the same chip as the transmit chains.

In other implementations, the wireless transceiver circuit 500 may include different amounts of transmit chains and feedback receive chains. For example, multiple transmit chains may be coupled to a single feedback chain, and the wireless transceiver circuit 500 may calibrate groups of transmit chains (a certain chip or chips) of the plurality of transmit chains individually. For example, the wireless transceiver circuit 500 may include 8 groups of 2 feedback receive chains for a total of 16 feedback receive chains for the 64 transmit chains. When there are less feedback receive chains than transmit chains, the transmit chains may be calibrated over multiple calibration operations. To illustrate, the 64 transmit chains may be calibrated over four calibration operations or cycles using the same 16 feedback receive chains. In such implementations, the loopback circuitry 516 may include circuitry (e.g., switches and traces) for directing outputs from different transmit chains to the same feedback receive chain.

The transmit chains 502 and 504 of the wireless transceiver circuit 500 may include components similar to the components of the receive chains 402-408 of the wireless receiver circuit 400 of FIG. 4. For example, each transmit chain 502 and 504 includes a corresponding amplifier, mixer, and divider. To illustrate, the first transmit chain 502 includes a first amplifier 522, a first mixer 524, and a first divider 526, the second transmit chain 502 includes a second amplifier 532, a second mixer 534, and a second divider 536.

The feedback receive chains 506 and 508 of the wireless transceiver circuit 500 may include or correspond to receive chains 402-408 of the wireless receiver circuit 400 of FIG. 4. For example, the feedback receive chains 506 and 508 may include similar components and provide similar function. As compared to the operations of the receive chains 402-408 FIG. 4, in FIG. 5 the feedback receive chains 506 and 508 of the wireless transceiver circuit 500 receive an output of a corresponding transmit chain as the input signal instead of the reference signal 460.

Each feedback receive chain 506 and 508 includes a corresponding amplifier, mixer, and divider. For example, the first receive chain 506 includes a third amplifier 542, a third mixer 544, and a third divider 546, and the second receive chain 508 includes a fourth amplifier 552, a fourth mixer 554, and a fourth divider 556.

The feedback receive chains 506 and 508 process the received looped back transmit chain output signals. When the feedback receive chains 506 and 508 are aligned or calibrated for phase alignment, the phase alignment determined by the phase estimator 510 from feedback receive chain outputs corresponds to a phase misalignment of dividers of the transmit chains 502 and 504.

Each of the transmit and feedback receive chains 502-508 may be configured to receive multiple types of input signals. For example, each transmit chain may be configured to receive wireless communication signals from a corresponding transmit processor (not shown) and a common synchronization or reference signal, reference signal 560 from the synchronization signal generator 509. The transmit chain may be configured to process the wireless communication signals and provide the processed wireless communication signals to a corresponding antenna (not shown) and to an input of a corresponding feedback receive chain of the feedback receive chains. Additionally, each transmit chain may be configured to process the reference signal 560 from the synchronization signal generator 509 and provide the output to an input of a corresponding feedback receive chain of the feedback receive chains.

In some implementations, the transmit chains 502 and 504 are coupled to switching circuitry (e.g., switching circuitry of the loopback circuitry) which includes one or more switches and paths to route output signals from each transmit chain to one or more of the feedback receive chains 506 and 508. For example, the switching circuitry may include a first switch or set of switches configured to route an output of the first transmit chain 502 to either of the first feedback receive chain 506 or the second feedback receive chain 508.

As illustrated in FIG. 5, the feedback receive chains 506 and 508 are configured to receive the outputs of a corresponding transmit chain, and as described above these outputs may corresponds to wireless communication signals for interference calculation and interference cancellation operations or to reference/synchronization signal outputs for phase calibration operations. Additionally, each feedback receive chain 502 and 506 may be coupled to a common reference signal, such as reference signal 460 of FIG. 4, to facilitate calibration of the phases of the dividers of the feedback receive chains as described with reference to FIG. 4. The received wireless communication signal outputs from the transmit chains may be processed by the receive chains and provided to a receive processor or other interference determination and/or cancellation circuitry (not shown) or provided to the phase estimator 510.

As illustrated in the example of FIG. 5, the transmit chains 502 and 504 are each coupled to the synchronization signal generator 509. An input of the first transmit chain 502 is coupled to a first output of the synchronization signal generator 509, and an input of the second transmit chain 504 is coupled to a second output of the synchronization signal generator 509. For example, the first mixer 524 of the first transmit chain 502 is coupled to the first output of the synchronization signal generator 509 and configured to receive the reference signal 560, and the second mixer 534 of the second transmit chain 504 is coupled to the second output of the synchronization signal generator 509 and configured to receive the reference signal 560.

Although not illustrated for simplicity, each transmit chain may include one or more additional inputs to receive wireless communication signals. Additionally or alternatively, the transmitter section or groups of transmit chains may include a common input to receive the reference signal 560 and additional traces and/or switches may provide the reference signal 560 to one or more of the corresponding transmit chains.

The received wireless communication signals and reference signal 560 may include or correspond to different types of signals or waves. For example, the received wireless communication signals from one or more transmit processors may include or correspond to RF or analog signals for wireless transmission via corresponding antennas, while the reference signal 560 may include or correspond to a digital signal or an analog signal. As an illustrative example, the reference signal 560 may include or correspond to a sine wave signal. As another illustrative example, the reference signal 560 may include or correspond to a reference OFDM signal.

The amplifier, amplifiers 522 and 532, of each transmit chain 502 and 504 may include or correspond to a power amplifier or other type of amplifier in a transmit chain. The amplifiers 522 and 532 may include or correspond to a linear amplifier. The amplifiers 522 and 532 are configured to amplify received input signals, such as the received RF signals for transmission via a corresponding antenna or the reference signal 560. In some implementations, the reference signal 560 may be configured to pass around the amplifiers 522 and 532 or to go through the amplifiers 522 and 532 in a different mode than received wireless communication signals. For example, the amplifiers 522 and 532 may amplify the reference signal 560 to a lesser extent than received signals or not at all, such as in a zero gain mode.

The amplifier, amplifiers 542 and 552, of each feedback receive chain 506 and 508 may include or correspond to a low noise amplifier (LNA) or other type of amplifier in a receive chain. The amplifiers 542 and 552 may include or correspond to a linear amplifier. The amplifiers 542 and 552 are configured to amplify received input signals, such as the received RF signals from a corresponding antenna, an output from a corresponding transmit chain (generated based on the reference signal 560), or the reference signal 460 of FIG. 4. In some implementations, the looped back output signal from the transmit chain or the reference signal 460 may be configured to pass around the amplifiers 542 and 552 or to go through the amplifiers 542 and 552 in a different mode than receive signals. For example, the amplifiers 542 and 552 may amplify the reference signal 560 to a lesser extent than received wireless communication signals or not at all, such as in a zero gain mode.

The mixer, mixers 524 and 534, of each transmit chain 502 and 504 may include or correspond to a frequency mixer or multiplier configured to generate a new signal, including or having one or more new frequencies, based on two signals applied to it, such as the different frequencies of the two signals applied to it. Each mixer 524 and 534 is configured to generate an output based on a corresponding pair of an input signal and a local oscillator signal. In the example of FIG. 5, the input signal may include or correspond to received wireless communication signals from a transmit processor or a common reference signal, the reference signal 560 common to all transmit chains, and the local oscillator signal may include or correspond to an adjusted (e.g., divided or reduced) local oscillator signal that is received from an external local oscillator or clock signal (e.g., external PLL) and adjusted based on a corresponding on-chip divider. The mixer of each transmit chain 502 and 504 may include or correspond to an unbalanced mixer, a signal balanced mixer, or a double balanced mixer. The mixer may include one or more circuit components such as transistors or diodes to generate the output.

The mixer, mixers 544 and 554, of each feedback receive chain 506 and 508 may include or correspond to a frequency mixer or multiplier configured to generate a new signal, including or having one or more new frequencies, based on two signals applied to it, such as the different frequencies of the two signals applied to it. Each mixer 544 and 554 is configured to generate an output based on a corresponding pair of an input signal and a local oscillator signal. In the example of FIG. 5, the input signal may include or correspond to received wireless communication signals from a corresponding antenna or a common reference signal, 560 common to all receive chains, and the local oscillator signal may include or correspond to an adjusted (e.g., divided or reduced) local oscillator signal that is received from an external local oscillator or clock signal (e.g., external PLL) and adjusted based on a corresponding on-chip divider. The mixer of each feedback receive chain 506 and 508 may include or correspond to an unbalanced mixer, a signal balanced mixer, or a double balanced mixer. The mixer may include one or more circuit components such as transistors or diodes to generate the output.

With this architecture of each transmit chain (and feedback receive chain) having a corresponding LO or divider, the wireless transceiver circuit 500 may accumulate a phase difference or misalignment between dividers over time. For example, the dividers of the transmit chains may experience a phase misalignment due to powering up and down individual transmit chains during operation (e.g., MIMO/OFDM operations), from external interference (e.g., noise, RF energy, sunburst, cosmic ray, etc.), from a power supply (power supply ringing), etc., or a combination thereof In FIG. 5, one or multiple external PLLs may be used. For example, a single external PLL may be used for each group (e.g., chip) of transmit chains. As another example, each group of transmit chains may have a dedicated external PLL.

The divider, dividers 526 and 536, of each transmit chain 502 and 504 may include or correspond to a frequency divider. The divider of each transmit chain 502 and 504 is arranged as a LO driven divider (often referred to as LO dividers) and is configured to reduce or divide a frequency of a received LO signal (or clock signal) and provide the reduced LO signal (or LO signal) to a corresponding mixer of the transmit chain.

The divider, dividers 546 and 556, of each feedback receive chain 506 and 508 may include or correspond to a frequency divider. The divider of each feedback receive chain 506 and 508 is arranged as a LO driven divider (often referred to as LO dividers) and is configured to reduce or divide a frequency of a received LO signal (or clock signal) and provide the reduced LO signal (or LO signal) to a corresponding mixer the feedback receive chain.

The synchronization signal generator 509 is configured to generate one or more types of common input signals for the transmit chains of the wireless transceiver circuit 500. For example, the synchronization signal generator 509 is configured to generate and provide the reference signal 560 to each transmit chain. The reference signal 560 is phase aligned across the transmit chains. The synchronization signal generator 509 enables the transmit chains to generate an output for the feedback receive chains to process and provide to the phase estimator 510 for transmit chain phase misalignment (divider phase misalignment) determination.

The phase estimator 510 may include or correspond to phase estimator 410 of FIG. 4 in some implementations. Although the synchronization signal generator 509 and phase estimator 510 are illustrated as separate components in the example of FIG. 5, in other implementations the synchronization signal generator 509 and the phase estimator 510 may be integral or a single component, or may be included in one or more other components.

The phase estimator 510 is configured to receive outputs from the feedback receive chains and to determine a relative phase difference between the outputs of the feedback receive chains. For example, the phase estimator 510 is configured to receive a corresponding output from each feedback receive chain of the plurality of receive chains 506 and 508, referred to as phase calibration signals.

Although the phase estimator 510 is coupled to the output of the respective mixer of each feedback receive chain and configured to receive a respective output of each feedback receive chain, the output of the feedback receive chains may bypass the phase estimator 510 in some implementations. For example, during wireless communication, the output of each feedback receive chain may physically bypass the phase estimator 510 and be directed to further RF processing or decoding or the output of each feedback receive chain may pass through the phase estimator 510 without the phase estimator processing the signal or with the phase estimator 510 processing the signal for non-divider generated phase alignment.

Alternatively, the phase estimator 510 may be selectively coupled to the output of each feedback receive chain during certain operating mode, such as during calibration modes or divider alignment modes, through the use of additional switches and traces (not shown).

The phase estimator 510 may include or correspond to a processor or one or more correlators (e.g., correlator circuitry), and the phase estimator 510 is configured to determine phase misalignment in receive signals, referred to as phase calibration signals. For example, the phase estimator 510 is configured to determine gross phase misalignment indicative of divider or LO phase misalignment, and may also be configured to determine fine phase misalignment.

The loopback circuitry 516 may include circuitry configured to connect transmit chains to feedback receive chains, referred to herein as looping back signals or providing a looped back signal. For example, the loopback circuitry 516 includes traces and switches configured to route output signals from a particular transmit chain to an input of a particular corresponding feedback receive chain for further processing. In some implementations, the loopback circuitry 516 further includes one or more signal processing components, to process the looped back signals. To illustrate, the loopback circuitry 516 may include one or more filters, such as high pass filters, one or more attenuators, such as coarse attenuators, fine attenuators, etc., or a combination thereof. An example of loopback circuitry is provided in FIG. 6.

As described with reference to the reference signal 460 of FIG. 4, the looped back signals may be generated or processed (e.g., filtered) to have a frequency that falls within the operating range or band of operations of the wireless transceiver circuit 500. In some implementations, a harmonic of the looped back signals falls within the operating range or band of operations of the wireless transceiver circuit 500 and is used for phase calibration operations.

The reference signal 560 may include or correspond to a common external reference signal used for alignment or "synchronization" of a phase of a divider of the transmit chains. For example, the reference signal 560 may include or correspond to an analog signal, such as sine wave signal. The reference signal 560 may be generated by an oscillator, such as a voltage-controlled oscillator (VCO). As another example, the reference signal 560 may include or correspond to digital signal, such as clock signal or a square wave. In a particular implementation, the reference signal 560 is generated by a crystal oscillator. In another particular implementations, the reference signal 560 is generated by a PLL.

The reference signal 560 is common to each transmit chain and is phase aligned across all of the transmit chains. Using this common, phase aligned reference signal and the loopback circuitry between the transmit chains and corresponding feedback receive chains enables the feedback receive chains to receive outputs which would be phase aligned, but for any transmit chain divider phase misalignment. Accordingly, the feedback receive chains and phase estimator 510 may process the received loop back transmit outputs to determine transmitter side divider phase misalignment similar to the operations of FIG. 4 to determine receiver side phase misalignment.

As described with reference to FIG. 4, the reference signal 560 may be generated or processed (e.g., filtered) to have a frequency that falls within the operating range or band of operations of the wireless transceiver circuit 500. In some implementations, a harmonic of the reference signal 560 falls within the operating range or band of operations of the wireless transceiver circuit 500 and is used for phase calibration operations.

Although not shown for clarity, wireless transceiver circuit 500 may include one or more additional components, such as additional RF front end components of filters, resistors, capacitors, inductors, switches traces, etc. The wireless transceiver circuit 500 is configured to receive the reference signal 560 and selectively provide the reference signal 560 to each transmit chain. Additionally, in some implementations, the wireless transceiver circuit 500 is configured to process the reference signal 560 on-chip or receives a processed version of the reference signal 560, such as filtered and/or aligned version of the reference signal 560.

Prior to operation, the wireless transceiver circuit 500 may be calibrated for phase alignment, such as during factory calibration, when first placed into operation (e.g., initial installation), and/or when reset, rebooted, or reconfigured after initial installation. The wireless transceiver circuit 500 may be part of a base station or other network device any may operate continuously for a long duration, such as multiple years, without fully powering down or being reset.

During operation, the wireless transceiver circuit 500 may perform wireless communication operations. For example, the wireless transceiver circuit 500 may transmit and/or receive signals from a plurality of corresponding antennas (not shown) and process the received signals using one or more of the plurality of transmit and feedback receive chains of the wireless transceiver circuit 500. To illustrate, the wireless transceiver circuit 500 may transmit received MIMO signals, OFDM signals, etc., via a corresponding antenna. Over time, the dividers of the one or more transmit chains of the wireless transceiver circuit 500 may develop a phase misalignment with each other. Specifically, the dividers of one or more of the transmit chains may develop a phase mismatch relative to one another.

The wireless transceiver circuit 500 may periodically perform calibration operations for divider phase misalignment to identify and correct divider phase misalignment between transmit chains as described in FIG. 5. Additionally, such as prior to the transmitter side calibration operations of FIG. 5, the wireless transceiver circuit 500 may periodically perform receiver side calibration operations for divider phase misalignment to identify and correct divider phase misalignment between receive chains and between feedback receive chains as described in FIG. 4. The wireless transceiver circuit 500 may perform the calibration operations periodically based on time, based on one or more conditions (e.g., trigger conditions), or both, as described with reference to FIG. 4. The duration or time amount and/or the conditions for transmitter side calibration may differ from or be the same as the duration or time amount and/or the conditions for receiver side calibration.

During calibration operations, the wireless transceiver circuit 500 receives the common reference signal and provides the common reference signal to a plurality of transmit chains of the wireless transceiver circuit 500. For example, the wireless transceiver circuit 500 may provide the reference signal 560 to each transmit chain of the wireless transceiver circuit 500 or to each transmit chain of a group of transmit chains of the wireless transceiver circuit 500 (e.g., a specific chip of transmitter chains).

Each transmit chain that receives the reference signal 560 may be configured to provide the reference signal 560 to its corresponding mixer. For example, the first transmit chain 502 receives the reference signal 560 at a first input and provides the reference signal 560 to an input of the first mixer 524, and the second transmit chain 504 receives the reference signal 560 at a second input and provides the reference signal 560 to an input of the second mixer 534.

In addition, each transmit chain that receives the reference signal 560 further receives an external clock signal or local oscillator signal at a corresponding divider of the transmit chain. For example, the first transmit chain 502 receives a first LO signal at an input of a first divider 526 and the second transmit chain 504 receives a second LO signal at an input of a second divider 536. As described above, the LO signals may be the same signal, that is generated by the same on-chip LO or a single external LO (external PLL). Alternatively, the LO signals may be different LO signals generated by different LO devices on-chip or externally. When generated by multiple LO devices, the LO signals may be aligned or may correspond to aligned external LO signals from multiple PLLs. Although referred to as LO signals, the LO signals received at the dividers may also be referred to as external clock signals which are converted into LO signals by the dividers.

The divider of each transmit chain processes the received LO signal to generate an output signal, such as divided LO signal, with an adjusted or reduced frequency. The divider may be configured to reduce the frequency of the input LO signal by a factor of n, referred to a rank of the divider. For example, the divider may be configured to reduce the frequency of the received LO signal by 2, 3 4, 5, 6, 8, 12, 16, etc.

For example, the first transmit chain 502 receives a first LO signal at an input of a first divider 526, and the first divider 526 generates a divided LO signal and provides the divided LO signal to an input of the first mixer 524 of the first transmit chain 502. The second transmit chain 504 receives a second LO signal at an input of a second divider 536, and the second divider 536 generates a second divided LO signal and provides the second divided LO signal to an input of the second mixer 534 of the second receive chain 504. Although referred to as divided LO signals, the divided LO signals output by the dividers may also be referred to as LO signals for driving the mixers. The first and second divided LO signals 572 and 574 (or LO signals) may not be phase aligned due to a phase mismatch in the corresponding first and second dividers 526 and 536.

In each transmit chain, the mixer of the respective transmit chain processes the received input signals (reference and LO signals) to generate an output signal which is provided to a respective amplifier of the transmit chain. For example, the first mixer 524 of the first transmit chain 502 generates a first output signal based on the reference signal 560 and the first divided LO signal 572, and the second mixer 534 of the second receive chain 504 generates a second output signal based on the reference signal 560 and the second divided LO signal 574. The first and second mixer output signals may not be phase aligned due to a phase mismatch in the corresponding first and second dividers 526 and 536.

Each of the amplifiers 522 and 532 may be configured to process the received output of the corresponding mixer (mixer output signal) and generate an output, such as an amplified mixer signal (amplified version of the mixer output signal). Alternatively, the amplifiers 522 and 532 may not amplify the mixer output signal (e.g., process the mixer output signal in a zero gain mode) or the transmit chains may have circuitry (e.g., traces and switches) to bypass the amplifiers.

In each transmit chain, the amplifier of the respective transmit chain may process the received mixer output signal to generate an output signal which is provided (referred to as looped back) to a corresponding feedback receive chain. For example, the first amplifier 522 of the first transmit chain 502 generates a first output signal 582 based on the first mixer output signal from the first mixer 524, and the second amplifier 532 of the second receive chain 504 generates a second output signal 584 based on the second mixer output signal from the second mixer 534.

For each transmit chain, the output signal (e.g., mixer output signal or amplified mixer output signal) is provided to an input of a corresponding feedback receive chain, such as respective amplifier thereof. For example, a first looped back output (first output signal 582) from the first transmit chain 502 is provided as an input to the fourth amplifier 552 of the second feedback receive chain 508, and a second looped back output (second output signal 584) from the second transmit chain 504 is provided as an input to the third amplifier 542 of the first feedback receive chain 506. Both of these looped back transmit chain output signals should be aligned in phase, but for any transmit chain divider phase alignment due to each transmit chain receiving a common or phase aligned reference signal, reference signal 560.

After the outputs from the transmit chains are looped back (looped back outputs) for processing by the corresponding feedback receive chains, the feedback receive chains and phase estimator 510 operate similar to the receive chains 402-408 and phase estimator 410 of FIG. 4. For example, the feedback receive chains 506 and 508 of the wireless transceiver circuit 500 receive the looped back outputs, process the looped back outputs, and provide corresponding outputs to the phase estimator 510 for phase estimation.

Each feedback receive chain that receives a looped back transmit chain output signal may be configured to provide the transmit chain output signal to its corresponding amplifier. For example, the first receive chain 506 receives the second looped back output signal (second output signal 584) via loopback circuitry 516 and provides the second looped back output signal (second output signal 584) to an input of the first amplifier 542, and the second receive chain 508 receives the first looped back output signal (first output signal 582) at via loopback circuitry 516 and provides the first looped back output signal (first output signal 582) to an input of the fourth amplifier 552. The amplifiers 542 and 552 may be configured to process (e.g., amplify) the respective received looped back output signal and generate an output, such as an amplified looped back output signal (e.g., an amplified version of the looped back output signal).

Alternatively, the amplifiers 542 and 552 may not process or amplify the looped back output signal (e.g., process the looped back output signal in a zero gain mode) or the feedback receive chains may have circuitry (e.g., traces and switches) to bypass the amplifiers.

In addition, each feedback receive chain that receives a looped back output signal further receives a local oscillator signal at a corresponding divider of the feedback receive chain. For example, the first feedback receive chain 506 receives a third LO signal 566 at an input of the third divider 546 and the second feedback receive chain 508 receives a fourth LO signal 568 at an input of a fourth divider 556. As described above, the LO signals may be the same signal, that is generated by the same on-chip LO or a single external LO (external PLL). Alternatively, the LO signals may be different LO signals generated by different LO devices on-chip or externally. When generated by multiple LO devices, the LO signals may be aligned or may correspond to aligned external LO signals from multiple PLLs. Although referred to as LO signals, the LO signals received at the dividers may also be referred to as external clock signals for generating LO signals by the dividers.

The divider of each feedback receive chain processes the received LO signal to generate an output signal, such as divided LO signal, with an adjusted or reduced frequency. The divider may be configured to reduce the frequency of the input LO signal by a factor of n, referred to a rank of the divider. For example, the divider may be configured to reduce the frequency of the received LO signal by 2, 34, 5, 6, 8, 12, 16, etc.

For example, the first feedback receive chain 506 receives the third LO signal 566 at the input of the third divider 546, and the third divider 546 generates a third divided LO signal 576 and provides the third divided LO signal 576 to an input of the third mixer 544 of the first feedback receive chain 506. The second feedback receive chain 508 receives the fourth LO signal 568 at an input of the fourth divider 556, and the fourth divider 556 generates a fourth divided LO signal 578 and provides the fourth divided LO signal 578 to an input of the fourth mixer 554 of the second feedback receive chain 508. Although referred to as divided LO signals, the divided LO signals output by the dividers may also be referred to as LO signals for driving the mixers.

In each feedback receive chain, a corresponding looped back transmit chain output signal (or amplified version of the signal) is provided to an input of the corresponding mixer of the feedback receive chain. For example, an input of the third mixer 544 of the first feedback receive chain 506 receives the output signal 584 (or amplified output signal) of the second transmit chain 504, and an input of the fourth mixer 554 of the second feedback receive chain 508 receives the output signal 582 (or amplified output signal) of the first transmit chain 502. Both of these output signals (or amplified output signals) received at the different mixers of the feedback receive chains (e.g., third and fourth mixers 544 and 554) may have a phase alignment mismatch due to transmit chain divider phase misalignment (e.g., a phase misalignment between the first divider 526 of the first transmit chain 502 and the second divider 536 of the second transmit chain 504).

In each feedback receive chain, the mixer of the respective feedback receive chain processes the received input signals (looped back transmit output and LO signals) to generate an output signal which is provided to the phase estimator 510 for phase calibration, a phase calibration signal. For example, the third mixer 544 of the first feedback receive chain 506 generates a first phase calibration signal 586 based on the second output signal 584 and the third divided LO signal 576, and the fourth mixer 554 of the second feedback receive chain 508 generates a second phase calibration signal 588 based on the first output signal 582 and the fourth divided LO signal 578.

The third and fourth divided LO signals 576 and 578 may be phase aligned due to a phase alignment calibration procedure as described in FIG. 4 to align the phases of the third and fourth dividers 546 and 556 of the first and second feedback receive chains 506 and 508. Accordingly, the first and second phase calibration signals 586 and 588 may still have a phase difference because they were generated based on respective transmit chain output signals that have a phase misalignment.

The phase estimator 510 receives the plurality of outputs from the respective mixers of the feedback receive chains and determines a phase mismatch for each feedback receive chain (which is indicative of transmit chain divider phase misalignment). For example, the phase estimator 510 receives a plurality of phase calibration signals and determines or sets one phase calibration signal as a reference phase calibration signal. The phase estimator 510 may then determine a phase difference between each phase calibration signal and the reference phase calibration signal. The phase estimator 510 may then generate one or more phase adjustment outputs indicative of a phase alignment or misalignment for one or more of the transmit chains. Each phase adjustment output may indicate a particular phase adjustment for a particular divider of a transmit chain.

To illustrate, the phase estimator 510 may set the first phase calibration signal 586 (or corresponding path as a reference path) as a reference phase calibration signal and determine a phase difference between the reference phase calibration signal (i.e., the first phase calibration signal 586 in this example) and the second phase calibration signal 588. The phase estimator 510 may then determine a phase difference between the reference phase calibration signal (i.e., the first phase calibration signal 586 in this example) and one or more other received phase calibration signal from the one or more other feedback receive chains (not shown in FIG. 5 for simplicity). As phase is useful in relative terms, the dividers are only aligned to have a relative phase alignment and not an absolute phase alignment. Thus, it does not matter if the reference path is actually "misaligned" itself, such as from a prior or initial calibration or phase setting.

Alternatively, instead of having one set reference path or signal, the phase estimator 510 may determine a reference path and signal or correct phase setting/value for each calibration process, such as to limit or reduce an amount of phase adjustments. To illustrate, the phase estimator 510 may determine a phase of each received phase calibration signal, and then determine a most common or most similar phase, e.g., a median phase value or setting, of the received phase calibration signals by a comparison or sorting process. The phase estimator 510 may then use one of the phase calibration signals with the median value or setting as the reference path or determine to adjust dividers corresponding to the other phase calibration signals that differ from the median value or setting.

In some implementations, the phase estimator 510 may employ quantization in determining a phase adjustment. For example, the phase estimator 510 may determine an actual phase offset from the reference phase calibration signal is 93 degrees for a particular phase calibration signal. The phase estimator 510 may quantize this determined phase offset (93 degree) to generate a quantized phase offset, such as 90 degrees, based on a quantization factor or set of quantized values. For example, the phase estimator 510 may be configured or programmed with a set of quantized values to use for phase adjustments or with a quantization factor used to determine a set of quantized values. The set of quantized values and/or the quantization factor may be associated with or correspond to a rank of the divider. As the divider may reduce the input LO signal by a discrete factor, the phase difference (mismatch) between divided LO signals due to phase misalignment of the dividers corresponds to a discrete value. As an illustrative example, for a divider with a rank of 4, the divider caused phase misalignment will correspond to a value of 360 degrees divided by 4, or 0, 90, 180, or 270. Thus, the phase estimator 510 may be configured to determine and/or selected a quantized phase adjustment value based on the closest or most similar quantized phase adjustment value to the determine phased adjustment. In the above example, the 93 degree phase misalignment may be caused by multiple factors, such as a 90 degree phase misalignment from transmit chain divider misalignment and a 3 degree phase misalignment from other transmit chain circuitry, feedback receive chain circuitry, input LO signals, etc., or a combination thereof.

The operations in the phase estimator 510 may be performed by a processor employing FFT operations or by a correlator (e.g., a digital phase correlator). For example, a processor or other dedicated computational circuitry may be configured to perform SPDFT operations on the received phase calibration signal to determine a relative phase difference (mismatch) between the received phase calibration signals and the reference phase calibration signal.

As another example, the correlator may be configured to compare two received phase calibration signals to determine a relative phase difference (mismatch) between a particular received phase calibration signal and the reference phase calibration signal. The correlator may then compare a second particular received phase calibration signal and the reference phase calibration signal to determine a second relative phase difference (mismatch). Alternatively, multiple correlators may be employed to process each received phase calibration signal with the identified reference phase calibration signal in parallel.

After performing a phase calibration process, the phase estimator 510 may be configured to generate an output signal indicative of a result of the calibration process. For example, if not phase misalignment is detected, the phase estimator 510 may generate an output signal indicating no adjustment needed. Alternatively, the phase estimator 510 may not generate an output signal, such as a phase adjustment signal 590, when no adjustment is needed. For calibrations where one or more phase misalignments are detected, the phase estimator 510 may be configured to generate one or more phase adjustment signals 590 indicative of one or more phase misalignments, or may be configured to generate a single phase adjustment signal 590 that indicates multiple phase adjustments.

In some implementations, the phase estimator 510 may be configured to provide the phase adjustment signal(s) 590 to external phase adjustment circuitry (not shown), such as controller or divider control circuitry. Alternatively, the phase estimator 510 may be further configured to adjust a phase of the dividers of the transmit chains itself based on the phase adjustment signal(s) 590. For example, the phase estimator 510 may include or be configured to control a rotator (e.g., phase rotator or phase rotation circuitry) configured to adjust a phase rotation of one or more dividers of the wireless transceiver circuit 500. The rotator (not shown) may be located at an output of each transmit chain or coupled to an output of each transmit chain, or may be located along the input path of the LO signal to the divider or along the output path from the divider. As another example, the phase estimator 510 may include or be configured to control a phase of the input LO signal.

Accordingly, the wireless transceiver circuit 500 may be able to correct LO divider phase misalignment after initial calibration and during operation. The wireless transceiver circuit 500 may be able to periodically calibrate itself (e.g., transmit chains thereof) during normal operation without powering down or entering a maintenance mode. By properly aligning LO divider phase, the wireless transceiver circuit 500 may be able to more efficiently and effectively (e.g., with less errors) perform beamforming based wireless communications. For example, large numbers of transmit and receive chains may be properly phase aligned to generate beams and receive RF energy with increased directional and focused energy (narrower beams). Additionally, the wireless transceiver circuit 500 may be able to communicate more efficiently and with less errors in massive MIMO operations. Accordingly, wireless communication performance and experience may be increased due to the increases in beamforming performance and reduction in beam generation errors due to phase misalignment.

Although the example of FIG. 5 has been described with feedback receive chains and transmit chains, in other implementations the feedback receive chains may include other types of receive chains. For example, in some implementations the wireless transceiver circuit 500 includes transmit chains and receive chains, and the transmit chains provide their output to the receive chains, such as via loopback circuitry, and the receive chains process the looped back outputs and provide a phase calibration signal to the phase estimator 510.

Figure 6:
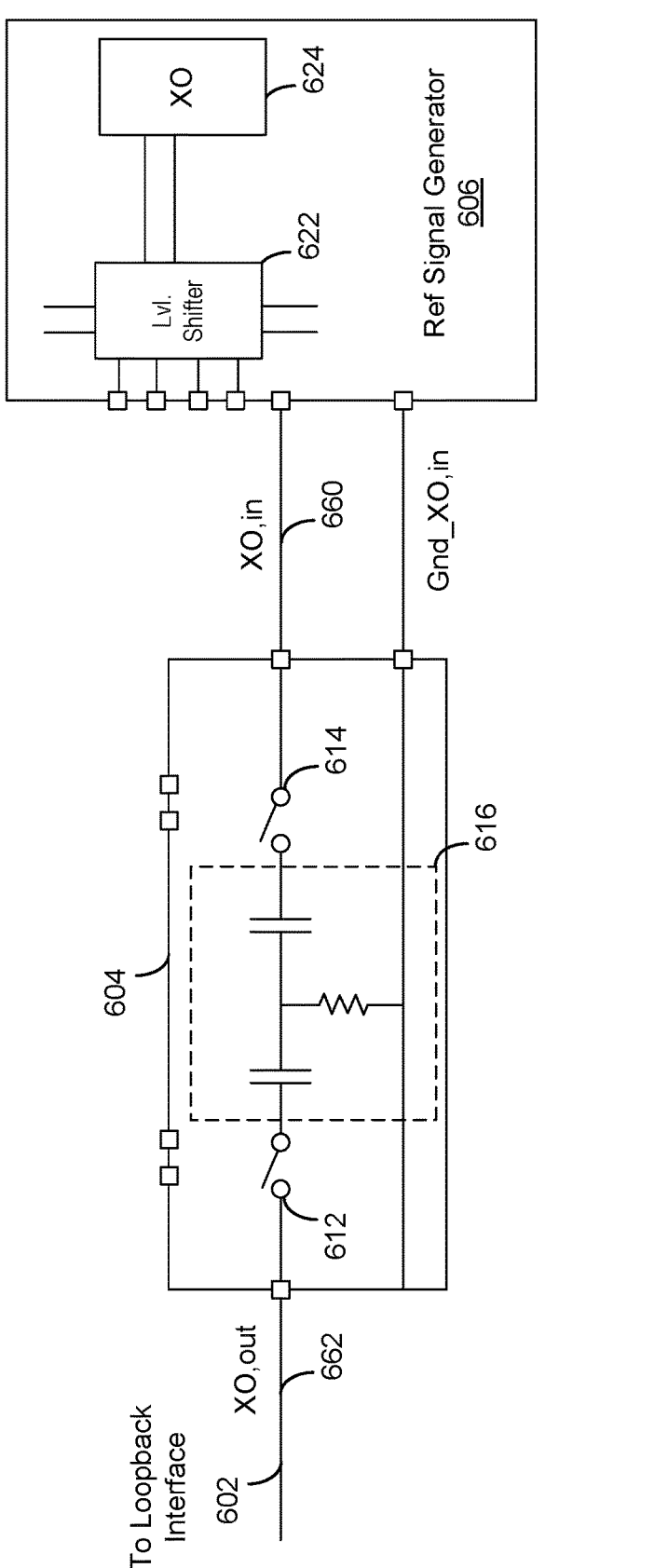
FIG. 6 is a diagram illustrating a loopback circuitry that supports enhanced phase calibration operations according to one or more aspects.

FIG. 6 is a circuit diagram illustrating loopback circuitry 600 according to one or more aspects. In some embodiments, the loopback circuitry 600 may be part of a sub-6 GHZ radio frequency (RF) transceiver, a mmWave radio frequency (RF) transceiver, or a converged sub-6 Ghz and mmWave radio frequency (RF) transceiver, such as described with reference to FIGS. 3-5. In other embodiments, portions or all of the loopback circuitry 600 may be located in a single integrated circuit (IC) sharing a common substrate or on the common substrate. The loopback circuitry 600 may include or correspond to the loopback circuitry 516 of FIG. 5 and/or may be coupled to the receive chain inputs of FIG. 4, the transmit chain outputs of FIG. 5, the feedback receive chain inputs of FIG. 5, or a combination thereof.

The loopback circuitry 600 includes traces and one or more switches and one or more filters and is configured to be coupled to a reference signal generator 606. As illustrated in the example of FIG. 6, the loopback circuitry 600 includes a connective trace 602, a switching and filter circuit 604, and the reference signal generator 606. In other implementations, the reference signal generator 606 is external to the loopback circuitry 600.

The connective trace 602 includes or corresponds to one or more traces to couple the switching and filter circuit 604 to a loopback interface, such as traces and switches to connect transmit chain outputs to feedback receive inputs. Additionally, the connective trace 602 includes or corresponds to one or more traces to couple the switching and filter circuit 604 to inputs of receive chains, such as the common inputs 416 and 418 of FIG. 4. The connective trace 602 is configured to provide a filtered version of the reference signal 660 (filtered reference signal 662) generated by the reference signal generator 606 to transmit, receive and feedback receive chains of the wireless transceiver.

The switching and filter circuit 604 includes one or more switches and one or more filters and is configured to receive the reference signal 660 from the reference signal generator 606, process the reference signal 660 to generate a filtered reference signal 662, and provide the filtered reference signal 662 to the connective trace. As illustrated in FIG. 6, the switching and filter circuit 604 includes two switches, a first switch 612 and a second switch 614, and includes a filter 616. As illustrated in FIG. 6, the filter 616 is a passive filter positioned between the first and second switches 612 and 614 and includes two capacitors coupled to each other and to a common resistor, which is coupled to a ground line.

Although the filter 616 illustrated in the loopback circuitry 600 is illustrated as a passive filter (e.g., passive high pass filter), in other implementations the loopback circuitry 600 may include one or more active filters (e.g., active high pass filters) in addition to or in place of the illustrated passive filter. Additionally, or alternatively, the loopback circuitry 600 may include additional switches, filters, and/or amplifiers to process the reference signal 460 or looped back transmit signals from the transmit chains.

The filtering on the reference signal 660 performed by the filter 616 enables a cleaner reference signal with less harmonics. The reduced harmonics may enable a more accurate phase determination or may enable determination of the phase with less precise equipment (e.g., lower bit analog-to-digital (A2D) converters). However, with aligned SPDFT processing and/or high bit order A2D converters, filtering the reference signal 660 or looped back transmit signals is not required for accurate phase determination for gross or coarse phase errors caused by divider misalignment.

The reference signal generator 606 may include or correspond to a circuitry configured to generate the reference signal 460 of FIG. 4, the synchronization signal generator 509 of FIG. 5, or both. As illustrated in the example of FIG. 6, the reference signal generator 606 is a crystal oscillator based reference signal generator and is configured to generate a square wave signal. The reference signal generator 606 includes a level shifter 622 and crystal oscillator 624, and is configured to generate the reference signal 660. The reference signal 660 may include or correspond to the reference signal 460 of FIG. 4 or the reference signal 560 of FIG. 5.

During operation, the reference signal generator 606 generates the reference signal 660 using the level shifter 622 and the crystal oscillator 624, and provides the reference signal 660 to the switching and filter circuit 604. The switching and filter circuit 604 processes the reference signal 660 to generate the filtered reference signal 662. To illustrate, the switches are controlled to provide the reference signal 660 to the filter 616, which high pass filters the reference signal 660 to remove a fundamental frequency of the reference signal 660 and optionally one or more lower order harmonics (lower order odd harmonics) of the reference signal 660 to generate the filtered reference signal 662. The filtered reference signal 662 is provided the switching and filter circuit 604 to the connective trace 602, such as via the first switch 612. The connective trace 602 provides the filtered reference signal 662 to the receive chains of the wireless receiver circuit 400 of FIG. 4. In some implementations, the loopback circuitry 600, such as the switching and filter circuit 604 thereof, includes a low pass filter to filter out high order harmonics of the reference signal 660, such as to filter out odd harmonics above a target frequency (e.g., operating band).

Accordingly, the loopback circuitry 600 is configured to enable more accurate performance of the receiver side calibration operations of FIG. 4, or to enable performance of the receiver side calibration operations of FIG. 4 with less signal processing circuitry or less precise phase measurement circuitry.

Alternatively, in other implementations the loopback circuitry 600 is configured to receive and process a transmit signal or a reference signal, such as an OFDM signal to be wirelessly transmitted on transmit chains or the reference signal 560 of FIG. 5, to generate a filtered version of the reference signal and provides the reference signal to an input of a transmit chain or an output of a feedback receive chain. Accordingly, the loopback circuitry 600 is configured to enable more accurate performance of the transmitter side calibration operations of FIG. 5, or to enable performance of the transmit side calibration operations of FIG. 5 with less signal processing circuitry or less precise phase measurement circuitry.

Figure 9:
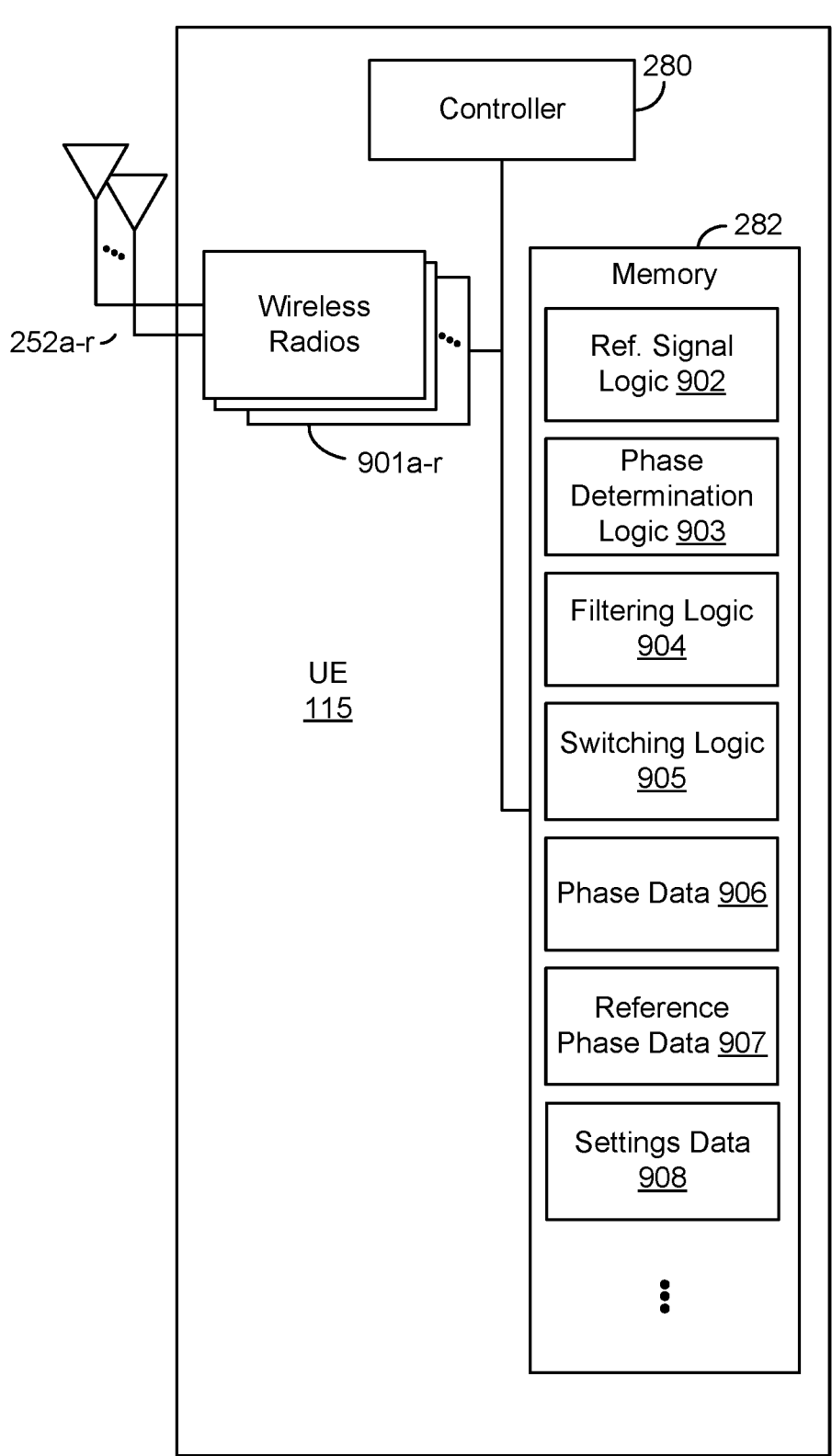
FIG. 9 is a block diagram of an example UE that supports enhanced phase calibration operations in a wireless radio according to one or more aspects of the disclosure.

FIG. 7 is a flow diagram 700 illustrating example blocks executed by a wireless communication device (e.g., a UE or base station) configured according to an aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 901a-r and antennas 252a-r. Wireless radios 901a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 9, memory 282 stores reference signal generation logic 902, phase determination logic 903, filtering logic 904, switching logic 905, phase data 906, reference phase data 907, and settings data 908. The data (902-908) stored in the memory 282 may include or correspond to data and/or logic to enable the operations of FIGS. 4-6.

At block 702, a wireless communication device, such as a UE or a base station, receives a reference signal at a respective input of a plurality of receive chains. The reference signal may include or correspond to the reference signal 460 of FIG. 4 or the reference signal 560 of FIG. 5. The receive chains may include or correspond to one or more receive chains of receive chains 402-408 of FIG. 4, feedback receive chains 506 and 508 of FIG. 5, or a combination thereof. The respective input of the plurality of receive chains may include or correspond to a common input as described with reference to FIGS. 4 and 5, such as common inputs 416 or 418 of FIG. 4 or a common input for the feedback receive chains 506 and 508. For example, the wireless communication device receives the reference signal 460 from an external component at the first common input 416 and the second common input 418.

At block 704, the wireless communication device processes, by each receive chain, the reference signal to generate a respective output signal. The output signal may include or correspond to a phase calibration signal of FIG. 4, such as a phase calibration signal of phase calibration signals 482-488. For example, each receive chain 402-408 of the wireless communication device outputs a corresponding phase calibration signal of the phase calibration signals 482-488, as described with reference to FIG. 4.

At block 706, the wireless communication device determines, for each receive chain, a phase alignment difference between the respective output signal of the receive chain and a reference output signal of a reference receive chain of the plurality of receive chains. The phase alignment difference may include or correspond to a difference in measured or estimated phases for the phase calibration signals 482-488.

The reference output signal may include or correspond to a particular output signal of a particular receive chain, such as the first phase calibration signal 482 of the first receive chain 402. For example, the wireless communication device may determine, for each receive chain, a phase alignment difference between the respective output signal of the receive chain and a reference output signal of a reference receive chain of the plurality of receive chains. To illustrate, the phase estimator 410 compares a first phase of the first phase calibration signal 482 (e.g., reference phase) for the first receive chain 402 (e.g., reference receive chain) to a second phase of the second phase calibration signal 484 for the second receive chain 404 to determine a phase difference between the first divider 426 of the first receive chain 402 and the second divider 436 of the second receive chain 404.

At block 708, the wireless communication device adjusts a phase alignment of a divider of at least one receive chain of the plurality of receive chains based on the determined phase alignment difference for the at least one receive chain. The divider may include or correspond to one or more dividers of the dividers 426, 436, 446, 456 of FIG. 4, or one or more dividers of the dividers 546 or 556 of FIG. 5. For example, the wireless communication device may adjust a phase alignment of one or more dividers of the dividers 426, 436, 446, 456 of FIG. 4 or one or more dividers of the dividers 546 or 556 of FIG. 5 based on a determine phase alignment difference. To illustrate, the phase estimator 410 adjusts a phase of the second divider 536 of the second receive chain 404 based on the phase difference determined between a reference phase and a phase of the second phase calibration signal 484 for the second receive chain 404.

The wireless communication device (e.g., UE or base station) may execute additional blocks (or the wireless communication device may be configured further perform additional operations) in other implementations. For example, the wireless communication device may perform one or more operations described above, such as described with reference to FIGS. 3-6. As another example, the wireless communication device may perform one or more aspects as presented below.

In a first aspect, the plurality of receive chains comprise receive chains, feedback receive chains, or a combination thereof.

In a second aspect, alone or in combination with the first aspect, the reference signal comprises a square wave signal that is phase aligned across the plurality of receive chains.

In a third aspect, alone or in combination with one or more of the above aspects, the reference signal comprises a crystal oscillator (XO) reference signal that is an external absolute phase reference signal aligned across multiple components of the device.

In a fourth aspect, alone or in combination with one or more of the above aspects, the XO reference signal is provided to the inputs of the receive chains via loopback traces and switches.

In a fifth aspect, alone or in combination with one or more of the above aspects, the wireless communication device further includes a high pass filter configured to filter out a fundamental harmonic of a received XO reference signal associated with a target harmonic frequency and is further configured to provide the XO reference signal to the respective input of each receive chain of the plurality of receive chains, wherein the XO reference signal comprises a high pass filtered version of the received XO reference signal.

In a sixth aspect, alone or in combination with one or more of the above aspects, to determine the phase alignment difference, the processing system configured to cause the wireless communication device to: perform synchronized SPDFT on the reference output of the reference receive chain and the respective outputs of the receive chains of the plurality of receive chains.

In a seventh aspect, alone or in combination with one or more of the above aspects, the wireless communication device is further configured to: downconvert in-band odd harmonics of the reference signal in the reference output of the reference receive chain and the respective outputs of the receive chains of the plurality of receive chains; and perform synchronized SPDFT on the downconverted in-band odd harmonics of the reference signal in the reference output of the reference receive chain and the respective outputs of the receive chains of the plurality of receive chains.

In an eighth aspect, alone or in combination with one or more of the above aspects, to determine the phase alignment difference, the processing system configured to cause the wireless communication device to: provide the respective outputs and the reference output to phase estimator circuitry, wherein the phase estimator circuitry includes at least one correlator configured to determine a phase alignment difference between a first receive chain and the reference receive chain based on a first output of the respective outputs and the reference output.

In a ninth aspect, alone or in combination with one or more of the above aspects, to adjust the phase alignment of the divider, the processing system configured to cause the wireless communication device to: adjust a rotator of a particular receive chain of the plurality of receive chains based on a particular determined phase alignment difference.

In a tenth aspect, alone or in combination with one or more of the above aspects, the particular determined phase alignment corresponds to a quantized phase difference, and wherein to adjust a rotator includes to adjust the rotator based on the quantized phase difference.

In an eleventh aspect, alone or in combination with one or more of the above aspects, to adjust the phase alignment of the divider, the processing system configured to cause the wireless communication device to: quantize the determined phase alignment difference into a quantized phase difference based on a rank of the divider or a set of quantized values; and adjust the phase alignment of the divider of the at least one receive chain using the quantized phase difference.

In a twelfth aspect, alone or in combination with one or more of the above aspects, each receive chain comprises: an amplifier including an input coupled to an input of the receive chain and configured to receive the reference signal and including an output coupled to a mixer; the mixer including inputs coupled to the amplifier and a divider and including an output coupled to a phase estimator, the mixer configured to receive an output from the amplifier; and the divider coupled to the mixer, the divider configured to receive an external clock signal and output a local oscillator signal to the mixer based on the external clock signal.

In a thirteenth aspect, alone or in combination with one or more of the above aspects, each receive chain includes a corresponding divider or local oscillator signal, and wherein one or more of the dividers or local oscillator signals has a phase misalignment relative to another divider or local oscillator, wherein each divider is configured to: receive a corresponding external clock signal, the external clock signal corresponding to a PLL output or VCO output; generate a corresponding local oscillator signal t based on the external clock signal; and provide the external clock signal to a corresponding mixer.

In a fourteenth aspect, alone or in combination with one or more of the above aspects, the wireless communication device further comprising: a first transceiver chip including a first set of receive chains of the plurality of receive chains and a first common input; a second transceiver chip including a second set of receive chains of the plurality of receive chains and a second common input; and reference signal generation circuitry separate from the first and second transceiver chips and configured to provide the reference signal to the first common input of the first transceiver chip and the second common input of the second transceiver chip.

In a fifteenth aspect, alone or in combination with one or more of the above aspects, the reference signal has a fundamental frequency outside of a set of frequencies of an operational receive band and has a harmonic frequency which is positioned within the set of frequencies of the operational receive band.

Figure 10:
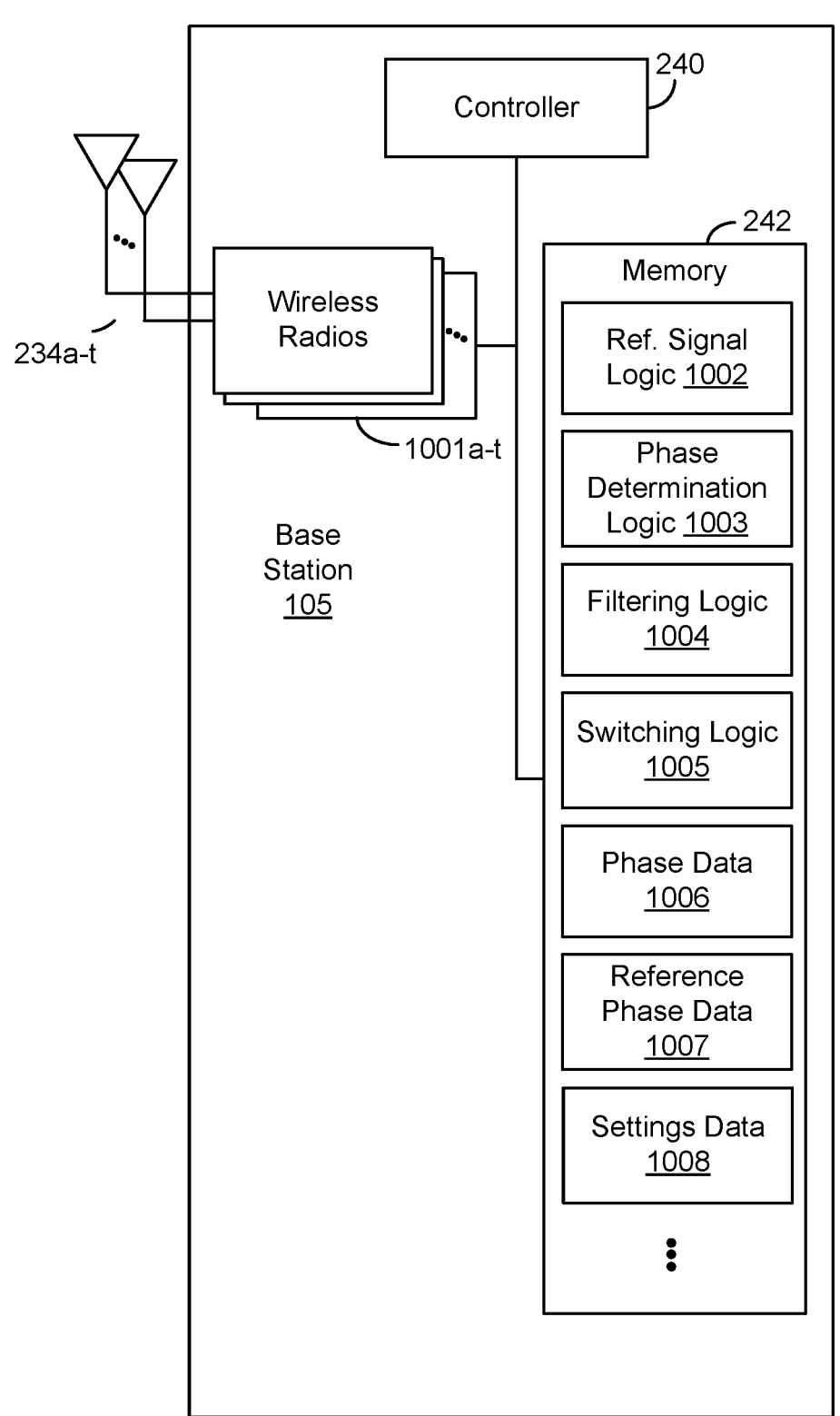
FIG. 10 is a block diagram of an example base station that supports enhanced phase calibration operations in a wireless radio according to one or more aspects of the disclosure.

In a sixteenth aspect, alone or in combination with one or more of the above aspects, the wireless communication device is further configured to perform phase alignment for one or more transmit chains, such as described with reference to FIGS. 8 and 10.

In a seventeenth aspect, alone or in combination with one or more of the above aspects, the wireless communication device further comprising: a first transceiver chip including a first set of receive chains of the plurality of receive chains; a second transceiver chip including a second set of receive chains of the plurality of receive chains; and clock signal generation circuitry separate from the first and second transceiver chips and configured to provide the external clock signal to the first and second transceiver chips. The clock signal generation circuitry may include a clock generator for the entire transceiver, for one or more chips of the transceiver, or for one or more chains of the receiver.

In an additional aspect, the wireless communication device includes or corresponds to a base station transceiver system, comprising: a first chip including: a plurality of first receive chains; and first synthesizer circuitry configured to provide one or more first local oscillator signals to the first receive chains; a second chip including: a plurality of second receive chains; and second synthesizer circuitry configured to provide one or more second LO signals to the second receive chains; one or more oscillators external to the first chip and the second chip and configured to provide an oscillator signal to the first synthesizer circuitry and the second synthesizer circuitry; a reference signal generation circuit configured to selectively provide a common input signal to inputs of the first receive chains of the first chip and the second receive chains of the second chip; and a processor circuit configured to process received signals through the first and second receive chains in response to the common input signal.

In an additional aspect, the wireless communication device includes: a processing system that includes processor circuitry and memory circuitry that stores code and is coupled with the processor circuitry, the processing system configured to cause the wireless communication device to: receive a respective output signal from a plurality of receive chains, the respective output signal corresponding to a common reference signal processed by each receive chain of the plurality of receive chains; determine a phase alignment difference between each respective output signal of each receive chain and a reference output signal of a reference receive chain of the plurality of receive chains; and output a phase alignment adjustment for a divider of the one or more receive chains based on the determined phase alignments.

Accordingly, wireless communication devices may perform divider phase alignment operations for receive and/or feedback receive chains, even during operation. By performing divider phase alignment operations, phase misalignment which develops during operation, such as when individual chains are powered up or down, can be corrected.

FIG. 8 is a flow diagram 800 illustrating example blocks executed wireless communication device (e.g., a UE or network entity, such as a base station) configured according to an aspect of the present disclosure. The example blocks will also be described with respect to base station 105 as illustrated in FIG. 10. FIG. 10 is a block diagram illustrating base station 105 configured according to one aspect of the present disclosure. Base station 105 includes the structure, hardware, and components as illustrated for base station 105 of any of FIGS. 3-6. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1001a-t and antennas 234a-t. Wireless radios 1001a-t includes various components and hardware, as illustrated in FIG. 2 for base station 105, including modulator/demodulators 232a-t, MIMO detector 236, receive processor 238, transmit processor 220, and TX MIMO processor 230. As illustrated in the example of FIG. 10, memory 242 stores reference signal generation logic 1002, phase determination logic 1003, filtering logic 1004, switching logic 1005, phase data 1006, reference phase data 1007, and settings data 1008. The data (1002-1008) stored in the memory 242 may include or correspond to data and/or logic to enable the operations of FIGS. 4-6.

At block 802, a wireless communication device, such as a UE or a network device (e.g., a base station 105), receives a reference signal at a respective input of a plurality of transmitter chains. The reference signal may include or correspond to one or more of the reference signal 460 of FIG. 4 or the reference signal 560 of FIG. 5. The transmitter chains may include or correspond to one or more transmit chains of transmit chains 502 and 504 of FIG. 5. The respective input of the plurality of transmitter chains may include or correspond to an input of a mixer of the transmitter chain or an input coupled to the synchronization signal generator 509. For example, the wireless communication device receives the reference signal 560 from the synchronization signal generator 509 at the first mixer 524 of the first transmit chain 502 and at the second mixer 534 of the second transmit chain 504.

At block 804, the wireless communication device processes, by each transmitter chain, the reference signal to generate a respective output signal. The output signal may include or correspond to one or more of the first output signal 582 or the second output signal 584 of FIG. 5. For example, each of the first and second transmit chains 502 and 504 processes the reference signal 560 to generate a corresponding output signal of the first output signal 582 and the second output signal 584.

At block 806, the wireless communication device provides the output signals from the transmitter chains to respective inputs of a plurality of receive chains. The receive chains may include or correspond to one or more feedback receive chains, such as one or more of the first and second feedback receive chains 506 and 508. The respective input of the receive chains may include or correspond to a respective input for each chain that is coupled to an output of a corresponding transmit chain, such as via loopback circuitry (e.g., loopback circuitry 600). For example, the first and second feedback receive chains 506 and 508 receives output signals 582 and 584 from the first and second transmit chains 502 and 504.

At block 808, the wireless communication device process, by each receive chain, a respective output signal of the received output signals from the transmitter chains to generate a corresponding phase calibration signal. The phase calibration signal may include or correspond to a phase calibration signal of the phase calibration signals 586 and 588 of FIG. 5. For example, each feedback receive chain 506 and 508 may generate a corresponding phase calibration signal 586 and 588 based on a corresponding output signal of the output signals 582 and 584 of the transmit chains 502 and 504.

At block 810, the wireless communication device determines, for each receive chain, a phase alignment difference for the corresponding phase calibration signal of each receive chain and a reference output of a reference receive chain of the plurality of receive chains, wherein the phase alignment difference is indicative of transmitter chain phase misalignment. For example, the wireless communication device may determine a phase alignment for each transmit chain based on received phase calibration signals from corresponding feedback receive chains. To illustrate, the phase estimator 510 compares a first phase of the first phase calibration signal 586 (e.g., reference phase) for the second transmit chain 504 and first feedback receive chain 506 (e.g., reference transmit and feedback receive chains) to a second phase of the second phase calibration signal 588 for the first transmit chain 502 and the second feedback receive chain 508 to determine a phase difference.

At block 812, the wireless communication device adjusts a phase alignment of a divider of at least one transmitter chain of the plurality of transmitter chains based on the determined phase alignment difference for the at least one transmitter chain. The divider transmission may include or correspond to one or more dividers of the dividers 526 or 536 of FIG. 5. For example, the wireless communication device may adjust a phase alignment one or more dividers of the dividers 526 or 536 of FIG. 5. To illustrate, the phase estimator 510 adjusts a phase of the first divider 526 of the second first transmit chain 502 based on the determined phase difference between the reference phase and the second phase of the first transmit chain 502 and the second feedback receive chain 508.

The wireless communication device (e.g., such as a UE or base station) may execute additional blocks (or the wireless communication device may be configured further perform additional operations) in other implementations. For example, the wireless communication device may perform one or more operations as described with reference to FIGS. 3-6. As another example, the wireless communication device may perform one or more aspects as described above with reference to FIGS. 7 and 9 or one or more aspects as presented below.

In a first aspect, the reference signal comprises a sine wave reference signal, an orthogonal frequency-division multiplexing (OFDM) reference signal, or a FFT reference signal.

In a second aspect, alone or in combination with the first aspect, the device is operating in a MIMO mode and a same signal is transmitted on all transmitter chains.

In a third aspect, alone or in combination with one or more of the above aspects, to determine the phase alignment difference, the wireless communication device is configured to: perform synchronized SPDFT on the reference output of the reference receive chain and the respective phase calibration signals of the receive chains of the plurality of receive chains.

In a fourth aspect, alone or in combination with one or more of the above aspects, to determine the phase alignment difference, the wireless communication device is configured to: provide the respective phase calibration signals and the reference output to phase estimator circuitry, wherein the phase estimator circuitry includes at least one correlator configured to determine a phase alignment difference between a first receive chain of the plurality of receive chains and the reference receive chain based on a first phase calibration signal of the respective phase calibration signals and the reference output.

In a fifth aspect, alone or in combination with one or more of the above aspects, to adjust the phase alignment of the divider, the wireless communication device is configured to: adjust a rotator of a particular transmitter chain of the plurality of transmitter chains based on a particular determined phase alignment difference.

In a sixth aspect, alone or in combination with one or more of the above aspects, the particular determined phase alignment corresponds to a quantized phase difference, and wherein to adjust a rotator includes to adjust the rotator based on the quantized phase difference.

In a seventh aspect, alone or in combination with one or more of the above aspects, to adjust the phase alignment of the divider, the wireless communication device is configured to: quantize the determined phase alignment difference into a quantized phase difference based on a rank of the divider or a set of quantized values; and adjust the phase alignment of the divider of the at least one transmitter chain using the quantized phase difference.

In an eighth aspect, alone or in combination with one or more of the above aspects, each transmit chain comprises: an amplifier coupled to the respective input and a mixer; the mixer coupled to the amplifier, a divider, and a phase estimator, the mixer configured to receive an output from the amplifier; and a divider coupled to the mixer and an external local oscillator, the divider configured to receive a local oscillator signal from the external local oscillator and provide an output based on the local oscillator signal to the mixer.

In a ninth aspect, alone or in combination with one or more of the above aspects, each transmit chain includes a corresponding divider or local oscillator signal, and wherein one or more of the dividers or local oscillator signals has a phase misalignment relative to another divider or local oscillator.

In a tenth aspect, alone or in combination with one or more of the above aspects, each divider is configured to: receive a corresponding external clock signal, the external clock signal corresponding to a phase locked loop (PLL) output or voltage controlled oscillator (VCO) output; generate a corresponding local oscillator signal based on the external clock signal; and provide the external clock signal to a corresponding mixer.

In an eleventh aspect, alone or in combination with one or more of the above aspects, each receive chain comprises: an amplifier including an input coupled to an input of the receive chain and configured to receive the reference signal and including an output coupled to a mixer; the mixer including inputs coupled to the amplifier and a divider and including an output coupled to a phase estimator, the mixer configured to receive an output from the amplifier; and the divider coupled to the mixer, the divider configured to receive an external clock signal and output a local oscillator signal to the mixer based on the external clock signal.

In a twelfth aspect, alone or in combination with one or more of the above aspects the receive chains are feedback receive chains and are phase aligned with each other.

In a thirteenth aspect, alone or in combination with one or more of the above aspects, prior to receiving the reference signal, performing phase alignment procedure on the receive chain.

In an additional aspect, the wireless communication device includes or corresponds to a base station transceiver system which includes: a first chip including: a plurality of first feedback receive chains and a plurality of first transmit chains; and first synthesizer circuitry configured to provide one or more first local oscillator signals to the first feedback receive chains and the first transmit chains; a second chip including: a plurality of second feedback receive chains and a plurality of second transmit chains; and second synthesizer circuitry configured to provide one or more second LO signals to the second receive chains and second transmit chains; one or more oscillators external to the first chip and the second chip and configured to provide an oscillator signal to the first synthesizer circuitry and the second synthesizer circuitry; a reference signal generation circuit configured to selectively provide a common input signal to inputs of the first transmit chains of the first chip and the second transmit chains of the second chip; a loopback circuit configured to selectively provide output signals from outputs of the first transmit chains of the first chip and the second transmit chains of the second chip to inputs of the first feedback receive chains of the first chip and the second feedback receive chains of the second chip; and a processor circuit configured to process received signals through the first and second feedback receive chains in response to the common input signal to the first and second transmit chains.

In an additional aspect, the wireless communication device includes: a processing system that includes processor circuitry and memory circuitry that stores code and is coupled with the processor circuitry, the processing system configured to cause the wireless communication device to: provide a reference signal to a respective input of each transmitter chain of a plurality of transmitter chains; receive a respective output signal from a plurality of receive chains, the respective output signal corresponding to a looped back transmit output signal of a corresponding transmitter chain of the plurality of transmitter chains which is processed by a corresponding receive chain of the plurality of receive chains; determine a phase alignment difference between each respective output signal of each receive chain and a reference output signal of a reference receive chain of the plurality of receive chains; and output a phase alignment adjustment for a divider of one or more transmitter chains based on the determined phase alignments.

Accordingly, wireless communication devices may perform divider phase alignment operations for receive transmit chains, even during operation. By performing divider phase alignment operations, phase misalignment which develops during operation, such as when individual chains are powered up or down, can be corrected.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 3 and 4 may be combined with one or more blocks (or operations) described with reference to another of the figures. For example, one or more blocks (or operations) of FIG. 3 may be combined with one or more blocks (or operations) of FIG. 1. As another example, one or more blocks associated with FIG. 4 may be combined with one or more blocks (or operations) associated with FIG. 1. Additionally, or alternatively, one or more operations described above with reference to FIGS. 1-4 may be combined with one or more operations described with reference to FIGS. 5-10

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A device for wireless communication, comprising:
a processing system that includes processor circuitry and memory circuitry that stores code and is coupled with the processor circuitry, the processing system configured to cause the device to:
receive a reference signal at a respective input of a plurality of receive chains;
process, by each receive chain, the reference signal and a respective local oscillator signal of the receive chain to generate a respective output signal;
determine, for each receive chain, a phase alignment difference between the respective output signal of the receive chain and a reference output signal of a reference receive chain of the plurality of receive chains; and
adjust a phase alignment of a divider of at least one receive chain of the plurality of receive chains based on the determined phase alignment difference for the at least one receive chain.

2. The device of claim 1, wherein the plurality of receive chains comprise receive chains, feedback receive chains, or a combination thereof, and wherein the respective input of each receive chain is coupled to an input of a respective amplifier of each receive chain that is configured to amplify received wireless signals.

3. The device of claim 1, wherein the reference signal comprises a square wave signal that is phase aligned across the plurality of receive chains.

4. The device of claim 1, wherein the reference signal comprises a crystal oscillator (XO) reference signal that is an external absolute phase reference signal aligned across multiple components of the device.

5. The device of claim 4, wherein the XO reference signal is provided to the inputs of the receive chains via loopback traces and switches.

6. The device of claim 4, further comprising
a high pass filter configured to filter out a fundamental harmonic of a received XO reference signal associated with a target harmonic frequency; and
wherein the processing system is further configured to cause the device to provide the XO reference signal to the respective input of each receive chain of the plurality of receive chains, wherein the XO reference signal comprises a high pass filtered version of the received XO reference signal.

7. The device of claim 1, wherein to determine the phase alignment difference, the processing system is configured to cause the device to:
perform synchronized single point discrete Fourier transform (SPDFT) on the reference output signal of the reference receive chain and the respective output signals of the receive chains of the plurality of receive chains.

8. The device of claim 1, wherein the processing system is further configured to cause the device to:
downconvert in-band odd harmonics of the reference signal in the reference output signal of the reference receive chain and the respective output signals of the receive chains of the plurality of receive chains; and
perform synchronized single point discrete Fourier transform (SPDFT) on the downconverted in-band odd harmonics of the reference signal in the reference output signal of the reference receive chain and the respective output signals of the receive chains of the plurality of receive chains.

9. The device of claim 1, wherein to determine the phase alignment difference, the processing system is configured to cause the device to:
provide the respective output signals and the reference output signal to phase estimator circuitry, wherein the phase estimator circuitry includes at least one correlator configured to determine a phase alignment difference between a first receive chain and the reference receive chain based on a first output of the respective outputs and the reference output signal.

10. The device of claim 1, wherein to adjust the phase alignment of the divider, the processing system is configured to cause the device to:
adjust a rotator of a particular receive chain of the plurality of receive chains based on a particular determined phase alignment difference.

11. The device of claim 1, wherein to adjust the phase alignment of the divider, the processing system is configured to cause the device to:
quantize the determined phase alignment difference into a quantized phase difference based on a rank of the divider or a set of quantized values; and
adjust the phase alignment of the divider of the at least one receive chain using the quantized phase difference.

12. The device of claim 1, wherein each receive chain comprises:
an amplifier including an input coupled to an input of the receive chain and configured to receive the reference signal and including an output coupled to a mixer;
the mixer including inputs coupled to the amplifier and a divider and including an output coupled to a phase estimator, the mixer configured to receive an output from the amplifier; and
the divider coupled to the mixer, the divider configured to receive an external clock signal and output the respective local oscillator signal to the mixer based on the external clock signal, wherein the divider is located on a first chip and the external clock signal is generated by an external component located on a second chip.

13. The device of claim 1, wherein each receive chain includes a corresponding divider, and wherein one or more of the dividers has a phase misalignment relative to another divider, wherein each divider is configured to:
receive a corresponding external clock signal, the external clock signal corresponding to a phase locked loop (PLL) output or voltage controlled oscillator (VCO) output;
generate the respective local oscillator signal based on the external clock signal; and
provide the external clock signal to a corresponding mixer.

14. The device of claim 1, further comprising:
a first transceiver chip including a first set of receive chains of the plurality of receive chains and a first common input;
a second transceiver chip including a second set of receive chains of the plurality of receive chains and a second common input; and
reference signal generation circuitry separate from the first and second transceiver chips and configured to provide the reference signal to the first common input of the first transceiver chip and the second common input of the second transceiver chip.

15. The device of claim 1, wherein the reference signal has a fundamental frequency outside of a set of frequencies of an operational receive band and has a harmonic frequency which is positioned within the set of frequencies of the operational receive band.

16. A device for wireless communication, comprising:

a processing system that includes processor circuitry and memory circuitry that stores code and is coupled with the processor circuitry, the processing system configured to cause the device to:

receive a reference signal at a respective input of a plurality of transmitter chains;

process, by each transmitter chain, the reference signal and a respective local oscillator signal of the receive chain to generate a respective output signal;

provide the output signals from the transmitter chains to respective inputs of a plurality of receive chains;

process, by each receive chain, a respective output signal of the received output signals from the transmitter chains to generate a corresponding phase calibration signal;

determine, for each receive chain, a phase alignment difference for the corresponding phase calibration signal of each receive chain and a reference output of a reference receive chain of the plurality of receive chains, wherein the phase alignment difference is indicative of transmitter chain phase misalignment; and adjust a phase alignment of a divider of at least one transmitter chain of the plurality of transmitter chains based on the determined phase alignment difference for the at least one transmitter chain.

17. The device of claim 16, wherein the reference signal comprises a sine wave reference signal, an orthogonal frequency-division multiplexing (OFDM) reference signal, or a fast Fourier transform (FFT) reference signal.

18. The device of claim 16, wherein the device is operating in a multiple-input and multiple-output (MIMO) mode and a same signal is transmitted on all transmitter chains.

19. The device of claim 16, wherein to determine the phase alignment difference, the processing system is configured to cause the device to:

perform synchronized single point discrete Fourier transform (SPDFT) on the reference output of the reference receive chain and the respective phase calibration signals of the receive chains of the plurality of receive chains.

20. The device of claim 16, wherein to determine the phase alignment difference, the processing system is configured to cause the device to:

provide the respective phase calibration signals and the reference output to phase estimator circuitry, wherein the phase estimator circuitry includes at least one correlator configured to determine a phase alignment difference between a first receive chain of the plurality of receive chains and the reference receive chain based on a first phase calibration signal of the respective phase calibration signals and the reference output.

21. The device of claim 16, wherein to adjust the phase alignment of the divider, the processing system is configured to cause the device to:

adjust a rotator of a particular transmitter chain of the plurality of transmitter chains based on a particular determined phase alignment difference.

22. The device of claim 16, wherein to adjust the phase alignment of the divider, the processing system is configured to cause the device to:

quantize the determined phase alignment difference into a quantized phase difference based on a rank of the divider or a set of quantized values; and adjust the phase alignment of the divider of the at least one transmitter chain using the quantized phase difference.

23. The device of claim 16, wherein each transmit chain comprises:

an amplifier coupled to the respective input and a mixer;

the mixer coupled to the amplifier, a divider, and a phase estimator, the mixer configured to receive an output from the amplifier; and a divider coupled to the mixer and an external local oscillator, the divider configured to receive the respective local oscillator signal from the external local oscillator and provide an output based on the respective local oscillator signal to the mixer.

24. The device of claim 23, wherein each transmit chain includes a corresponding divider, and wherein one or more of the dividers has a phase misalignment relative to another divider.

25. The device of claim 24, wherein each divider is configured to:

receive a corresponding external clock signal, the external clock signal corresponding to a phase locked loop (PLL) output or voltage controlled oscillator (VCO) output;

generate the respective local oscillator signal based on the external clock signal; and provide the external clock signal to a corresponding mixer.

26. The device of claim 16, wherein each receive chain comprises:

an amplifier including an input coupled to an input of the receive chain and configured to receive the reference signal and including an output coupled to a mixer;

the mixer including inputs coupled to the amplifier and a divider and including an output coupled to a phase estimator, the mixer configured to receive an output from the amplifier; and the divider coupled to the mixer, the divider configured to receive an external clock signal and output the respective local oscillator signal to the mixer based on the external clock signal.

27. The device of claim 16, wherein the receive chains are feedback receive chains and are phase aligned with each other.

28. The device of claim 16, prior to receiving the reference signal, performing phase alignment procedure on the receive chain.

29. A base station transceiver system, comprising:

a first chip including:

a plurality of first receive chains; and first synthesizer circuitry configured to provide one or more first local oscillator (LO) signals to the first receive chains;

a second chip including:

a plurality of second receive chains; and second synthesizer circuitry configured to provide one or more second LO signals to the second receive chains;

one or more oscillators external to the first chip and the second chip and configured to provide an oscillator signal to the first synthesizer circuitry and the second synthesizer circuitry;

a reference signal generation circuit configured to selectively provide a common input signal to inputs of the first receive chains of the first chip and the second receive chains of the second chip; and a processor circuit configured to process received signals through the first and second receive chains in response to the common input signal.

30. A base station transceiver system, comprising:

a first chip including:

a plurality of first feedback receive chains and a plurality of first transmit chains; and first synthesizer circuitry configured to provide one or more first local oscillator (LO) signals to the first feedback receive chains and the first transmit chains;

a second chip including:

a plurality of second feedback receive chains and a plurality of second transmit chains; and second synthesizer circuitry configured to provide one or more second LO signals to the second feedback receive chains and second transmit chains;

one or more oscillators external to the first chip and the second chip and configured to provide an oscillator signal to the first synthesizer circuitry and the second synthesizer circuitry;

a reference signal generation circuit configured to selectively provide a common input signal to inputs of the first transmit chains of the first chip and the second transmit chains of the second chip;

a loopback circuit configured to selectively provide output signals from outputs of the first transmit chains of the first chip and the second transmit chains of the second chip to inputs of the first feedback receive chains of the first chip and the second feedback receive chains of the second chip; and a processor circuit configured to process received signals through the first and second feedback receive chains in response to the common input signal to the first and second transmit chains.

* * * * *